(12) United States Patent
Birkestrand

(10) Patent No.: US 7,989,973 B2
(45) Date of Patent: Aug. 2, 2011

(54) FLUID-RESPONSIVE OSCILLATION POWER GENERATION METHOD AND APPARATUS

(76) Inventor: Orville J. Birkestrand, Davenport, IA (US)

( * ) Notice: Subject to any disclaimer, the term of this patent is extended or adjusted under 35 U.S.C. 154(b) by 257 days.

(21) Appl. No.: 11/961,236

(22) Filed: Dec. 20, 2007

(65) Prior Publication Data

US 2008/0148723 A1 Jun. 26, 2008

Related U.S. Application Data

(60) Provisional application No. 60/876,600, filed on Dec. 22, 2006.

(51) Int. Cl.
| | |
|---|---|
| *F03D 9/00* | (2006.01) |
| *H02P 9/04* | (2006.01) |
| *F03B 13/00* | (2006.01) |
| *F03B 13/10* | (2006.01) |
| *B64C 9/00* | (2006.01) |
| *B64C 11/28* | (2006.01) |
| *F03D 5/06* | (2006.01) |

(52) U.S. Cl. ............... 290/44; 290/43; 290/54; 290/55; 416/23; 416/24; 416/82; 416/83

(58) Field of Classification Search .......... 290/43, 290/44, 54, 55; 416/23, 24, 82, 83
See application file for complete search history.

(56) References Cited

U.S. PATENT DOCUMENTS

| 237,851 | A | * | 2/1881 | Foskett | 416/80 |
|---|---|---|---|---|---|
| 1,856,093 | A | * | 5/1932 | Ford et al. | 244/48 |
| 2,465,285 | A | * | 3/1949 | Schwickerath | 416/41 |
| 2,749,871 | A | * | 6/1956 | Scherer et al. | 114/276 |
| 3,289,979 | A | * | 12/1966 | Brunk | 244/206 |
| 3,480,235 | A | * | 11/1969 | Multhopp | 244/216 |
| 3,532,067 | A | * | 10/1970 | Baker et al. | 114/279 |
| 3,580,203 | A | * | 5/1971 | Martin | 114/39.31 |
| 3,790,106 | A | * | 2/1974 | Sweeney et al. | 244/203 |
| 3,877,836 | A | * | 4/1975 | Tompkins | 416/119 |
| 3,928,771 | A | * | 12/1975 | Straumsnes | 290/43 |
| 4,082,479 | A | | 4/1978 | Rangi et al. | |
| 4,180,372 | A | | 12/1979 | Lippert et al. | |
| 4,194,707 | A | * | 3/1980 | Sharpe | 244/9 |

(Continued)

FOREIGN PATENT DOCUMENTS

EP 0 683 316 A1 11/1995

*Primary Examiner* — T C Patel
*Assistant Examiner* — Pedro J Cuevas
(74) *Attorney, Agent, or Firm* — Cesari and McKenna, LLP; John F. McKenna

(57) ABSTRACT

Power generation apparatus includes a wing-shaped blade having opposite sides, opposite ends and leading and trailing edges extending between those ends. A lift differential producing device in the blade produces a lift differential at the opposite sides of the blade and that device is switched so that one blade side or the other produces the greater lift. A blade shaft extends along an axis in the blade that is in close parallel relation to the leading edge of the blade and that shaft is fixed to move with the blade. Supports support the blade shaft so that the blade can be positioned in a fluid stream with the leading edge facing upstream and swing about the axis between first and second extreme positions on opposite sides of a neutral position, the blade shaft oscillating with the blade. A coordinating device coordinates the switching of the lift differential producing device with the swinging of the blade so that the switching occurs at the extreme positions of the blade. A method of generating power using the apparatus is also disclosed.

34 Claims, 29 Drawing Sheets

U.S. PATENT DOCUMENTS

| | | | |
|---|---|---|---|
| 4,238,171 A * | 12/1980 | Van Mechelen | 416/67 |
| 4,247,253 A | 1/1981 | Seki et al. | |
| 4,307,677 A * | 12/1981 | Jastram et al. | 114/167 |
| 4,355,955 A * | 10/1982 | Kisovec | 416/23 |
| 4,383,801 A * | 5/1983 | Pryor | 416/17 |
| 4,388,888 A * | 6/1983 | Gushurst, Jr. | 114/90 |
| 4,415,312 A * | 11/1983 | Brenneman | 416/119 |
| 4,441,675 A * | 4/1984 | Boehringer et al. | 244/213 |
| 4,470,770 A * | 9/1984 | Grose | 417/334 |
| 4,541,242 A * | 9/1985 | Thompson, Jr. | 60/506 |
| 4,582,013 A * | 4/1986 | Holland, Jr. | 114/39.3 |
| 4,595,336 A | 6/1986 | Grose | |
| 4,610,140 A * | 9/1986 | Thompson, Jr. | 60/506 |
| 4,612,768 A * | 9/1986 | Thompson, Jr. | 60/506 |
| 5,009,571 A | 4/1991 | Smith | |
| 5,193,978 A * | 3/1993 | Gutierrez | 416/24 |
| 5,324,169 A | 6/1994 | Brown et al. | |
| 5,326,224 A * | 7/1994 | Lee et al. | 416/97 R |
| 5,503,525 A * | 4/1996 | Brown et al. | 416/24 |
| 6,152,405 A * | 11/2000 | Muller | 244/219 |
| 6,641,089 B2 * | 11/2003 | Schwetzler et al. | 244/198 |
| 6,644,919 B2 * | 11/2003 | Bauer et al. | 416/23 |
| 6,860,449 B1 * | 3/2005 | Chen | 244/12.1 |
| 7,081,690 B2 * | 7/2006 | Coman | 290/54 |
| 7,083,382 B2 * | 8/2006 | Ursua | 416/110 |
| 7,223,137 B1 * | 5/2007 | Sosnowski | 440/3 |
| 7,456,514 B2 * | 11/2008 | Ahmad | 290/54 |
| 7,461,609 B1 * | 12/2008 | Ott et al. | 114/102.29 |
| 7,632,069 B2 * | 12/2009 | Kelley | 416/80 |
| 7,781,905 B2 * | 8/2010 | Newman | 290/54 |
| 7,905,705 B2 * | 3/2011 | Kelley | 416/80 |
| 2002/0071767 A1 * | 6/2002 | Bauer et al. | 416/231 R |
| 2003/0123983 A1 | 7/2003 | Bolduc | |
| 2004/0251383 A1 * | 12/2004 | McDonnell | 244/82 |
| 2007/0063520 A1 * | 3/2007 | Ahmad | 290/54 |
| 2007/0157864 A1 * | 7/2007 | Aldin et al. | 114/281 |
| 2007/0297903 A1 * | 12/2007 | Morris | 416/132 A |
| 2008/0048455 A1 * | 2/2008 | Carney | 290/54 |
| 2008/0149779 A1 * | 6/2008 | Phillips | 244/201 |
| 2008/0203729 A1 * | 8/2008 | Zajchowski et al. | 290/43 |
| 2009/0058091 A1 * | 3/2009 | Douglas | 290/53 |
| 2009/0174192 A1 * | 7/2009 | Newman | 290/55 |
| 2009/0194997 A1 * | 8/2009 | Stabins | 290/54 |
| 2009/0217851 A1 * | 9/2009 | Kind | 114/39.3 |
| 2009/0224549 A1 * | 9/2009 | Williams | 290/55 |
| 2009/0224551 A1 * | 9/2009 | Williams | 290/55 |
| 2009/0241820 A1 * | 10/2009 | Rohden | 114/39.3 |
| 2009/0309368 A1 * | 12/2009 | Kumano | 290/54 |
| 2009/0314353 A1 * | 12/2009 | Vasshus et al. | 137/14 |
| 2009/0322091 A1 * | 12/2009 | Jack | 290/53 |
| 2010/0034649 A1 * | 2/2010 | Taylor | 415/208.1 |
| 2010/0090469 A1 * | 4/2010 | Sullivan | 290/55 |
| 2010/0096854 A1 * | 4/2010 | Paluszek et al. | 290/44 |
| 2010/0181777 A1 * | 7/2010 | Grigg | 290/55 |
| 2010/0213718 A1 * | 8/2010 | Kelly | 290/55 |
| 2010/0221112 A1 * | 9/2010 | Bevirt et al. | 416/135 |
| 2010/0230546 A1 * | 9/2010 | Bevirt et al. | 244/175 |
| 2011/0006534 A1 * | 1/2011 | Achard et al. | 290/54 |

* cited by examiner

FLUID-RESPONSIVE OSCILLATION POWER GENERATION METHOD AND APPARATUS

RELATED APPLICATION

This application claims the benefit of Provisional Application No. 60/876,600, filed Dec. 22, 2006.

BACKGROUND OF THE INVENTION

This invention relates to power generation apparatus employing one or more blades which move under the influence of a fluid stream to produce an output force capable of performing useful work. For example, the apparatus may be used to power a pump or to reciprocate or rotate a shaft. The invention relates especially to such apparatus whose blade(s) oscillates instead of rotates in the presence of a wind or water stream to produce an output torque for driving an electric generator to provide grid quality power to a utility grid or to a remote off grid community, for example. A method for generating power in this fashion is also part of my invention.

Conventional hydro-electric power generators usually comprise large rotating element water turbines requiring their own power house and extensive civil engineering works, and which require a large pressure head to be effective which, in turn, demands a high dam for creating this potential energy; the dam is also useful for storing a large amounts of this water energy. None of these large conventional hydro-electric power generators are suitable for operating in the shallow waters found in most rivers and tidal flows. As a result, hydro-electric water projects that utilize the entire river flow tend to be quite large thereby consuming large amounts of real estate and capital, while displacing whole populations of people with wholesale disruption of the local environment and the natural migration of fish.

There are many locations, usually conveniently near large inland and some coastal cities which are the major consumers of electric power, where a large mass of relatively shallow water flows in a constant and reliable manner under a relatively low pressure head at relatively low velocity, generally in areas of relatively flat terrain, which may not be suitable for efficiently driving a conventional water turbine. These include the fresh water currents in various rivers and streams throughout the world such as the Mississippi and Amazon Rivers, as well ocean currents such as Gulf Stream and the tidal currents in places like the Bay of Fundy.

Likewise, conventional wind turbines are not practical or desirable in or near large urban or suburban neighborhoods where the power is consumed, because these machines are considered unsafe for these areas. Also, cities are not usually built where there are high winds and are only placed in large groups or farms at locations where they can be serviced efficiently and where they are exposed to relatively constant, high velocity winds. The areas where such windmill farms can be sited are limited both by the atmospheric conditions and by the safety and visual objections of people in the vicinity of the wind farms.

Thus, there is a need for a fluid responsive power generator and power generating method which can economically and safely extract useful power from relatively low head shallow waters and the more turbulent lower speed wind currents commonly found near major population centers and on flat terrain and to use that power to perform useful work such as the generation of electricity nearer the point of consumption, thereby saving the environmentally degradation as well as the capitol expense and losses of power transmission systems.

SUMMARY OF THE INVENTION

Accordingly it is the object of this invention to provide a smooth constant angular velocity output from an oscillating power generation apparatus which efficiently and safely extracts energy from a moving fluid to perform useful work.

Another object of the invention is to provide such apparatus which can utilize the energy in moving wind or water to produce shaft torque to generate electrical power without harming a significant portion of the bat, bird or fish populations that attempt to fly or swim thru them.

A further object of the invention is to provide apparatus of this type which can produce hydro power efficiently from low pressure head shallow water sources such as running rivers and tidal flows as well as slow moving deep oceans currents.

Another object is to provide power generation apparatus which can easily be retrofit to existing low rise dams in rivers and streams.

Yet another object is to provide a method for generation power having one more of the above advantages.

A further object of the invention is to provide such apparatus which when mounted atop a tower or urban building can exploit wind power to provide electrical energy in a safe, environmentally sound manner.

Other objects will, in part, be obvious and will, in part, appear hereinafter.

The invention accordingly comprises the sequence of steps and the features of construction, combination of elements and arrangement of parts which will be exemplified by the following detailed description, and the scope of the invention will be indicated in the claims.

In general, my power generation apparatus comprises at least one blade or vane having the general shape of a symmetrical aircraft wing, a segmented articulated rudder or the body and tail of a fish. In other words, the aerodynamic and hydrodynamic characteristics of the blade are essentially the same at opposite sides of the blade. Each blade has a leading edge and is mounted so that it can pivot about an axis extending the length of the blade adjacent to the leading edge thereof and typically on the leading edge radius centerline. When the blade is positioned in a fluid stream so that its leading edge faces upstream, the fluid current tends to move the blade in the direction of that side of the blade where the fluid flow rate over the blade surface is greater, thereby producing "lift". In a purely symmetrical blade, the direction of the movement is determined primarily by the attack angle of the blade. My blade, during each half cycle, utilizes four different methods to develop its forces: the first is the conventional "Lift" force described above which occurs near midcycle; the second is of a "Venturi" type nature which develops when the blade interacts with its boundary and it occurs in the part of the cycle where a normal aerodynamic blade would experience "Stall", the third force is the positive "Drag" force contribution to output torque that the blade produces just after it reaches either the top dead center (TDC) or bottom dead center (BDC) position and as it moves towards its neutral position, and the fourth occurs at the extreme of each stroke when the blade acts as a valve interacting with its boundary and cyclically blocks a portion of the flow.

In accordance with the invention, the geometrically symmetrical blade is caused to be cyclically nonsymmetrical so that the blade oscillates in a periodic fashion about its axis and this oscillatory motion is coupled to an output device that performs useful work. Preferably, the oscillatory motion of each blade is coupled by a constant angular velocity unidirectional device such as a crank or clutch to an electrical generator to generate electrical power. In other words, the angular excursions of the blade to angular extremes on each side of a neutral position are caused to rotate the generator rotor at a smooth constant rotational speed.

In one preferred embodiment of the invention, each blade is an articulated member composed of a main body which pivots about the blade axis located at the leading edge radius centerline of the main body and a flap or aileron pivotally connected to the trailing edge of the main body so that the flap can swing or bend relative to the main body between selected first and second positions. Of course, similar results could be achieved with a "wing warping" design such as the Wright Brothers used on their FLYER airplane, mimicking the natural motion of the body and tail of a fish; we chose to describe our invention using the word "flap" for clarity, but a one piece "warped wing" design could accomplish the same objectives perhaps more efficiently. In any event, in its first position, the flap makes an included angle with one side of the main body and in its second position, the flap makes an included angle with the other side of the main body.

The flap is actively controlled in relation to the angular position of the main body so that the flap is switched between its first and second positions at the two extremes of the angular excursion of the main body, hereinafter referred to as the top dead center (TDC) and bottom dead center (BDC) positions thereof. In other words, the flap or aileron is a bistable member which is automatically toggled between its first and second positions at the extremes of the swinging motion of the main body.

When the blade nears TDC or BDC, the fluid, by the transient machine geometry, is made to simultaneously accelerate on the blade side nearest the boundary while decelerating on its opposite side, causing a net pressure difference over the blade; this simultaneously increases the output torque produced of the blade and decisively aides the toggling of the flap.

When the flap is suddenly angled toward the TDC position of the main body at TDC, half of the fluid stream is momentarily trapped between a nearby housing boundary, causing high pressure on one side of the blade and flap, while simultaneously causing the whole flow of the stream to divert over to the other side of the blade and flap, causing higher velocities and lower pressures there, thereby tending to forcefully swing the blade toward the BDC position of the main body. Conversely, the same process occurs when the flap is angled toward the BDC position of the main body at BDC, the moving fluid stream is momentarily trapped between the nearby boundary and the flap thereby tending to swing the blade toward the TDC position of the main body. Thus, by coordinating the switching of the flap to the TDC and BDC positions of the main body, the blade as a whole is caused to oscillate about its pivot axis in a reliable, uniform and efficient manner over a wide range of fluid flow rates. The presence and actions of the flap are the main initiators of these important Venturi forces; machines without them are not as efficient, nor are their usual controls as flexible to changing loads.

Preferably, although not necessarily, there are two types of flywheels associated with these machines. The first flywheel, which rotates at a constant angular velocity in the same direction, usually doubles as the rotor of the generator and its function is to smooth out the oscillatory irregular forces on the aero/hydro blades or foils and to power them through their TDC and BDC positions; the second flywheel(s), which is optional, oscillates in forward and reverse directions during each cycle and may be mechanically coupled to each blade to temporarily store the mechanical energy of the system from the "water/wind hammer effects" at the TDC and BDC positions of the blade(s) and to release same in the middle of each swinging cycle when the coupling of torque to the output device is at a maximum. In this way, in addition to the Lift forces produced nearer midcycle, the Venturi-type boundary interaction forces produced as the blade approaches TDC and BDC, the positive contribution of the blade and flap Drag forces between TDC or BDC and the neutral position and the Water Hammer forces produced at the cyclical extremes, the apparatus produces a relatively uniform positive output torque during all sectors of the oscillatory motion of the blade.

Unlike conventional wind turbines (or water propeller type & Kaplan turbines), gusts and or turbulent changes of the free stream fluid velocity going through my machines do not change the apparent angle of attack of the fluid over the blades, making my machines more suitable for the more turbulent wind conditions found at lower heights and in urban centers.

Unlike those same conventional machines where the torque produced on the shaft is the lift force times the sine of the small apparent wind angle less the drag force times the cosine of the same small angle, the lift forces produced by my machine are uniquely made to directly produce output torque, especially at midcycle, while the drag forces produced by my blade(s) do not detract from the output torque, but actually positively contribute to the output torque for the first half of each half cycle, while the balance are uniquely relegated to being merely static tower (or structure) forces.

In another preferred embodiment of the invention, each blade is made non-symmetrical by incorporating a self energized Magnus roller into the blade which roller rotates about an axis extending parallel to the pivot axis of the blade, with the direction of rotation of this roller automatically reversing with each half cycle. When the roller is rotated, the aerodynamic and hydrodynamic characteristics of the otherwise geometrically symmetrically blade are changed so that the blade is no longer aerodynamically symmetrical and tends to swing in a direction depending on the direction of rotation of the Magnus roller. More specifically, there are lower pressures on the side of the blade at which the surface of the roller is moving in the same direction as the fluid flow and higher pressures on the side of the blade at which the surface of the roller is moving against the direction of the free stream fluid flow, resulting in an overall lift force to the blade. This lift force can be several times greater than that of a conventional aerofoil shape, depending upon the relative velocities. Thus, by coordinating the direction of rotation of that roller to the angular position of the blade in more or less the same way described above for the flap, the blade can be caused to oscillate when immersed in a fluid stream. In this embodiment, the very inertia of the mass of the Magnus rotor also performs the dual function as the flywheel in the articulated vane version of the apparatus. Of course, an oscillating Magnus roller may be incorporated into the bifurcated blade with a flap described above to increase the blade "Lift", "Drag", "Venturi" and "Water/Wind Hammer" forces as the blade swings between its TDC and BDC positions.

Magnus rotors are well known to produce several times higher lifting forces than the same sized aerofoil shapes. If they were to be incorporated into the blades of the rotor on a conventional wind machine (or propeller or Kaplan water machine) the pertinent velocity ratios, because of the nature of geometries of rotating blades, would be a maximum at the tips, decreasing to zero at the hub, making a significant portion of the structure nonproductive. The oscillating blade geometry of my machines is unique in this regard in that these desirable ratios are maintained over the whole length and surface of the blades and not merely at their tips, making every part of my blade structure equally productive. When used in my machines, this allows them to be utilized competitively in lower speed wind regimes, commonly found in or near metro areas and at lower tower heights, greatly expanding the locales where the apparatus can be deployed competitively. Additionally, in all of my machines, the moving working element is supported at both ends instead of being cantilevered supported from as in all rotating blade machines. This means that my machines can be built in larger, more economical sizes using less materials. Also in my machines, this working moving element is of constant cross section over substantially its entire length making it less expensive to build, while the geometry of a rotating blade has a fundamental requirement that it be of a compound tapered and twisted geometry in order to be efficient. Finally, it is not necessary to constantly twist or feather my blades during midcycle to accommodate higher fluid velocities nearer the top of the machine verses those nearer its bottom as is required on some larger conventional windmills.

Each blade may be made non-symmetrical to produce "lift" at one side of the blade in other ways such as by using any of the well known leading edge flaps, manipulating Coanda effect flows or by forming holes in the opposite side walls of the blade and alternately drawing a vacuum at the holes in the two walls in a periodic fashion that is correlated to the angular position of the blade as described above.

The housing boundaries surrounding these oscillating blades can have two or more functions: first, in all machines, a portion of the boundary is arranged so as to interact with the flaps at the TDC and BDC positions to produce the Venturi-type forces and to cyclically stop a portion of the incoming fluid steam flow creating the aforementioned Water/Wind Hammer Effect; the second function, used in open source applications such as that of a wind machine or a water machine placed in an ocean current, is to turn the surrounding fluid stream going by the sides of the machine, creating a high speed flow regime directly behind the machine, eliminating sources of form drag on the tower or other structure there and eliminating the second of two prime flow conditions that Albert Betz assumed in his famous theory of the maximum power extractable from a flowing fluid, the first prime flow condition assumption having been eliminated with the above-described Water/Wind Hammer cyclically stopping of the flow.

As we shall see, my basic apparatus and method can be used in a variety of applications to capture the energy of both moving water and air in both open, partially and totally closed flow regimes. Thus, they can be used to produce hydroelectric power by efficiently exploiting flows in waste water pipes, irrigation, water sport and rain run off channels, sacrificial flows over existing dams to maintain fish stocks, shallow "run of the river" and tidal flows, as well as deep ocean currents without the need to impound large volumes of water behind high dams. Likewise, they are is more easily and safely adapted to respond to lower speed and turbulent wind power sources found in or near urban and suburban sites at lower tower heights.

BRIEF DESCRIPTION OF THE DRAWINGS

For a fuller understanding of the nature and objects of the invention, reference should be made to the following detailed description taken in connection with the accompanying drawings, in which.

DETAILED DESCRIPTION OF ILLUSTRATIVE EMBODIMENTS

1. Open But Contained Channel Embodiment

Figure 1:
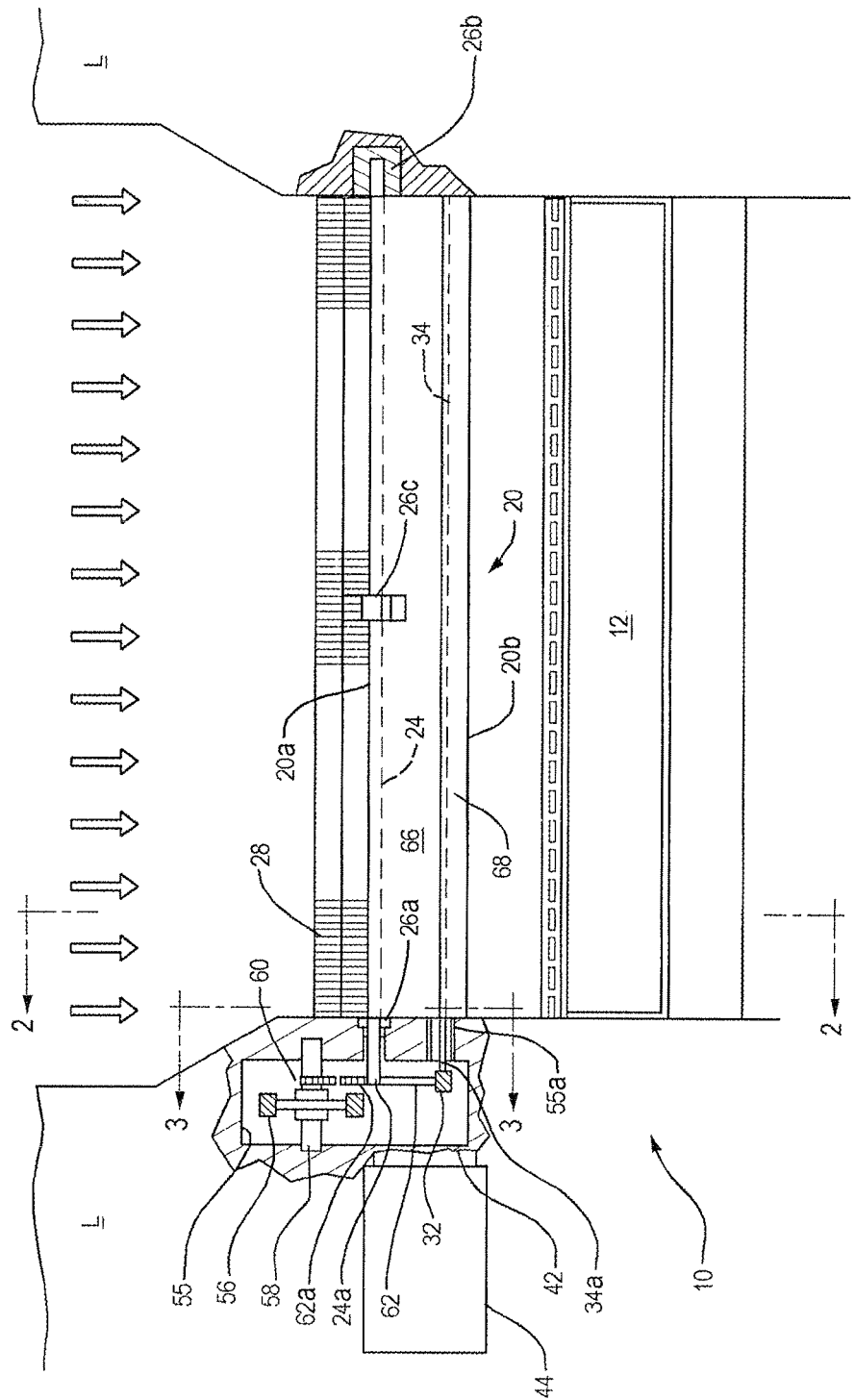
FIG. 1 is a plan view with parts broken away showing my power generation apparatus as used to extract energy from a moving stream of water in a relatively open shallow channel to produce electrical power.
Figure 2:
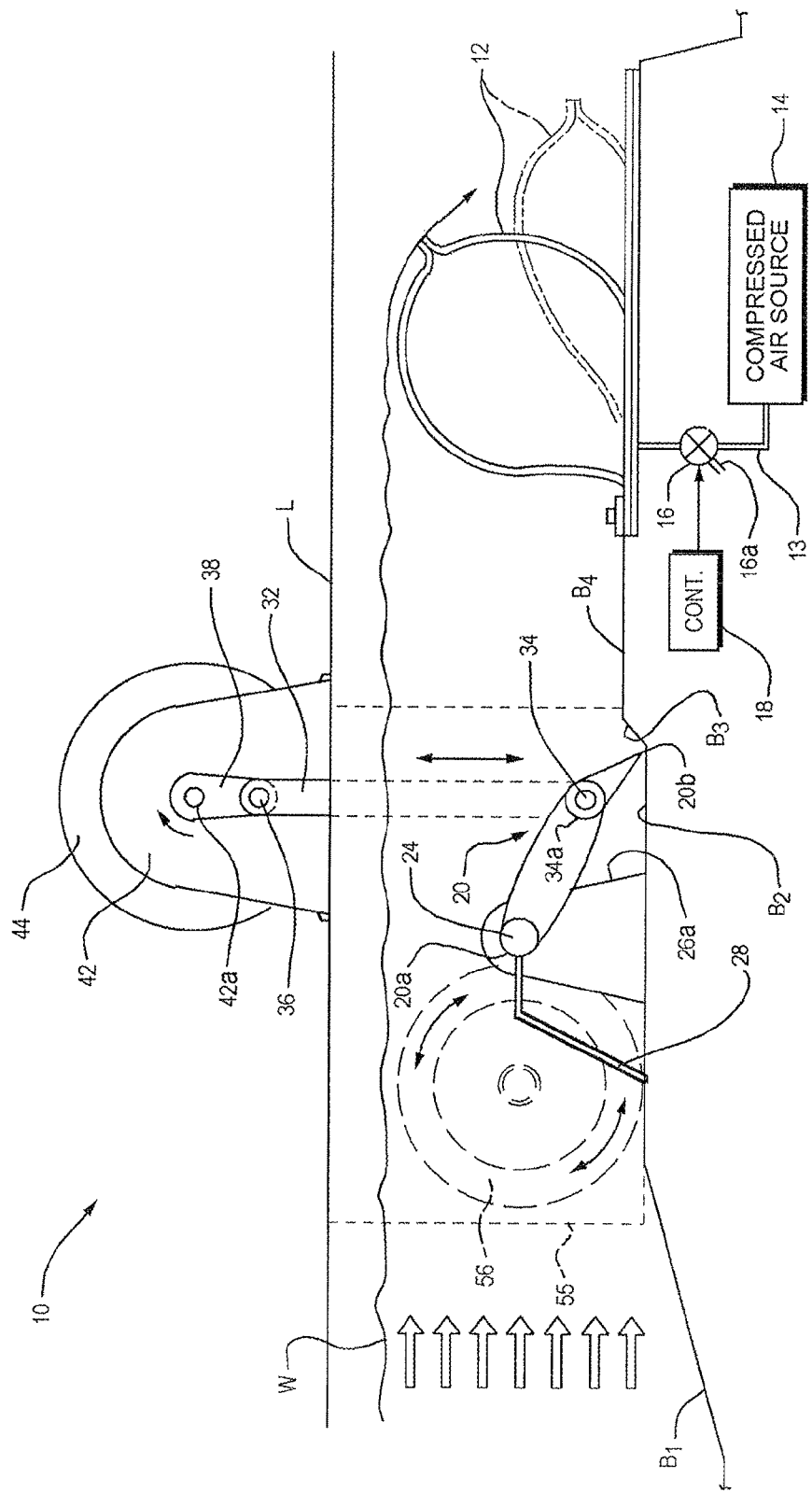
FIG. 2 is a side elevational view on a larger scale thereof.

Refer now to FIGS. 1 and 2 of the drawings which show my apparatus, indicated generally at 10, as adapted to extract useful power from a relatively low pressure head, open shallow water source such as a river or stream, low head being defined as less than 10 meters. Apparatus 10 is mounted on the land L at opposite sides of a river whose water W flows in the direction of the arrows. Preferably, the bed of the river is prepared to receive the apparatus by profiling it is shown in FIG. 2 such that there is an incline $B_1$ leading to a level area $B_2$ directly under the apparatus. At the downstream edge of area $B_2$, the bed steps up at $B_3$ to a second level area $B_4$ which is the site of a conventional, inflatable dam 12.

The interior of dam 12 is connected by a pipe 13 to a compressed air source 14, the flow of air through pipe 13 being controlled by a remote controlled valve 16. In order to increase the level of the water W over the bed $B_2$, the valve 16 is operated to connect source 14 to dam 12 so that the dam inflates and swings up to its solid line position shown in FIG. 2. When that water level is no longer needed to operate apparatus 10, or when it is desirable to increase the velocity of the water W through the apparatus 10, the dam may be progressively deflated to its dot/dash line position shown in FIG. 2 by operating valve 16 so that the air in the dam is vented through an outlet 16a in the valve. For operation in tidal flow applications, it may be desirable to lower dam 12 to let the tide reverse flow into a holding bay behind the machine and be released later in the normal direction in a controllable way to generate the electricity in the amount and at the time desired. Valve 16 may be operated manually, or automatically by a controller 18. The inflatable dam may be inflated and deflated for a variety of reasons not related to the actual cycling of the blade 20, including to allow the passage of small boats, ice, flood waters, debris or fish over the blade 20 structure at selected times; it may also, for a example, be inflated to allow a tide to flow inward into a catch basin and then reinflated to control the rate and timing of the outflow.

Still referring to FIGS. 1 and 2, apparatus 10 comprises an articulated blade or vane 20 which may have the general shape of a symmetrical aircraft wing. Blade 20 has a leading edge 20a along which extends a shaft 24 whose opposite ends are journalled in bearing blocks 26a and 26b supported on the land L on opposite sides of the river such that blade 20 spans the river with its leading edge 20a facing upstream. Thus, blade 20 is swingable up and down about the axis of shaft 24.

Preferably a trash rack 28 in the form of a grating is positioned on the upstream side of blade 20 to protect any fish in the river and to screen out debris which might otherwise impinge on blade 20 and adversely effect its operation.

As best seen in FIG. 2, a link 32 is connected at its lower end to a pivot 34a mounted on the side of blade 20 only coincidentally concentric to shaft 34 extending the length of blade 20. The upper end of that link is connected by a pivot 36 to a crank arm 38 adapted to turn the input shaft 42a of a gear box 42 in the direction shown by the arrow. The gear box 42 drives a conventional electrical generator 44 so that the generator generates useful electrical power.

Figure 3:
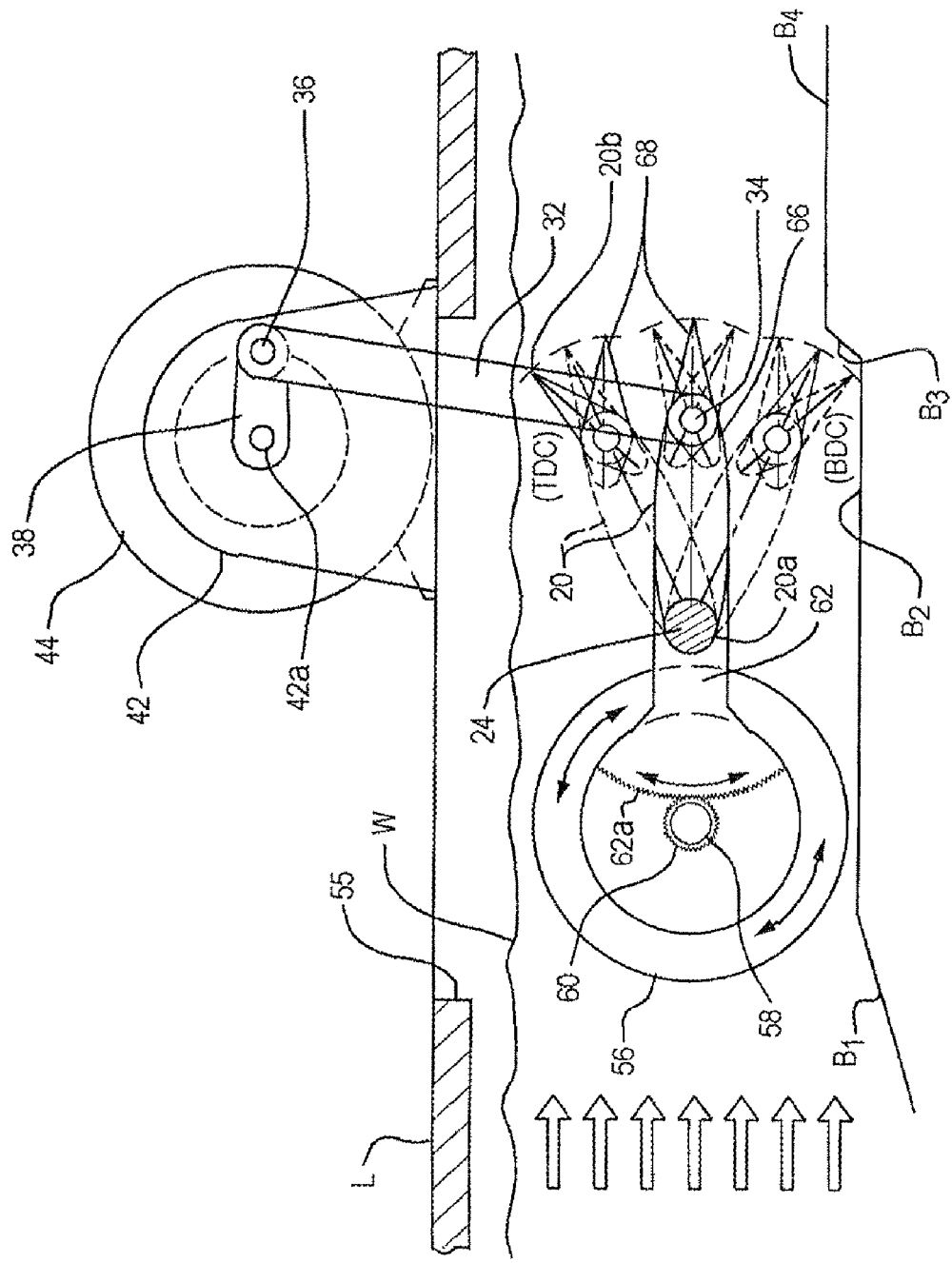
FIG. 3 is a side elevational view showing the operation of the oscillating blade component of the apparatus in greater detail.

Blade 20 has freedom of movement to swing between a lower position shown in FIG. 2, referred to as its bottom dead center (BDC) position, wherein the trailing edge 20b of the blade is close to the foot of bed step $B_3$ and an upper position, referred to as the top dead center (TDC) position, indicated in FIG. 3, wherein edge 20b is positioned close to the surface of water W. These two positions coincide with the lower-most and uppermost positions of crank arm 38 in the crank cycle. When the crank arm 38 is horizontal, blade 20 is in a horizontal neutral position, as shown in FIG. 3. The constant rotational velocity crank mechanism, causes the blade to rotate fastest at mid-cycle and to slow down for the turns at TDC & BDC. It also provides maximum mechanical leverage of the generator rotor's inertia at the TDC & BDC end turning points and causes the blade to move with a smooth sinusoidal velocity through its full cycle, all of which are exactly what is most desired.

Preferably, apparatus 10 includes an inertial device for temporarily storing the system energy which the blade 20 harvests at its TDC and BDC positions so that that energy can be released later in the same half cycle of the crank arm 38 when the crank angles are more favorable to the transmission of cranking forces from blade 20 to gear box 42. In the illustrated apparatus, the inertial device is a solid, relatively heavy, gear speed increased flywheel 56 mounted on a shaft 58 whose opposite ends are journalled in opposite walls of a pit 55 in land L at one side of the river. Shaft 58 also carries a pinion 60 which meshes with an arcuate rack 62a on a lever arm 62 which is fixed to rotate with an end segment 24a of shaft 24 that extends into pit 55 as best seen in FIG. 1. The opposite end of arm 62, along with the lower end of link 32, are pivotally connected to an end segment 34a extending from the end of blade 20 which segment may be an extension of, or coincidentally concentric with, shaft 34 which extension extends into pit 55 through a vertical access slot 55a formed in the pit wall adjacent to the bearing block 26a.

Thus, as blade 20 moves up and down between its TDC and BDC positions, flywheel 56 is rotated in one direction or the other to capture the "Water Hammer" energies generated at TDC and BDC. The rotor of the generator 44 also acts as a flywheel for smoothing out the oscillatory motion of the blade and to assist the blade's motion reversal at its TDC and BDC positions.

As noted above, blade 20 has the general shape of a geometrically symmetrical aircraft wing as shown in solid lines in FIG. 3. The blade is made geometrically cyclically non-symmetrical by dividing the blade into two parts, namely a main body 66 and a flap 68, those two parts being hinged together along their lengths by shaft 34 or an equivalent. Thus, the flap 68 can pivot or bend relative to main body 66 independently of the pivotal motion of the main body on shaft 24, as shown in FIG. 3.

In accordance with the invention, the angular position of flap 68 is actively controlled in relation to the crank cycle of crank arm 38 and thus the angular position of blade 20 on its shaft 24. More particularly, flap 20 can be swung between a first position wherein its trailing end, constituting the trailing end 20b of blade 20 as a whole, is angled toward the TDC position of the blade and a second position wherein the trailing end of the flap is angled toward the BDC position of the blade. These two positions of the flap 68 are shown in solid lines in FIG. 3 when blade 20 is in its TDC position in that figure. A mechanism that may be located in main body 66 switches or toggles the flap 68 between these two positions.

Figure 4:
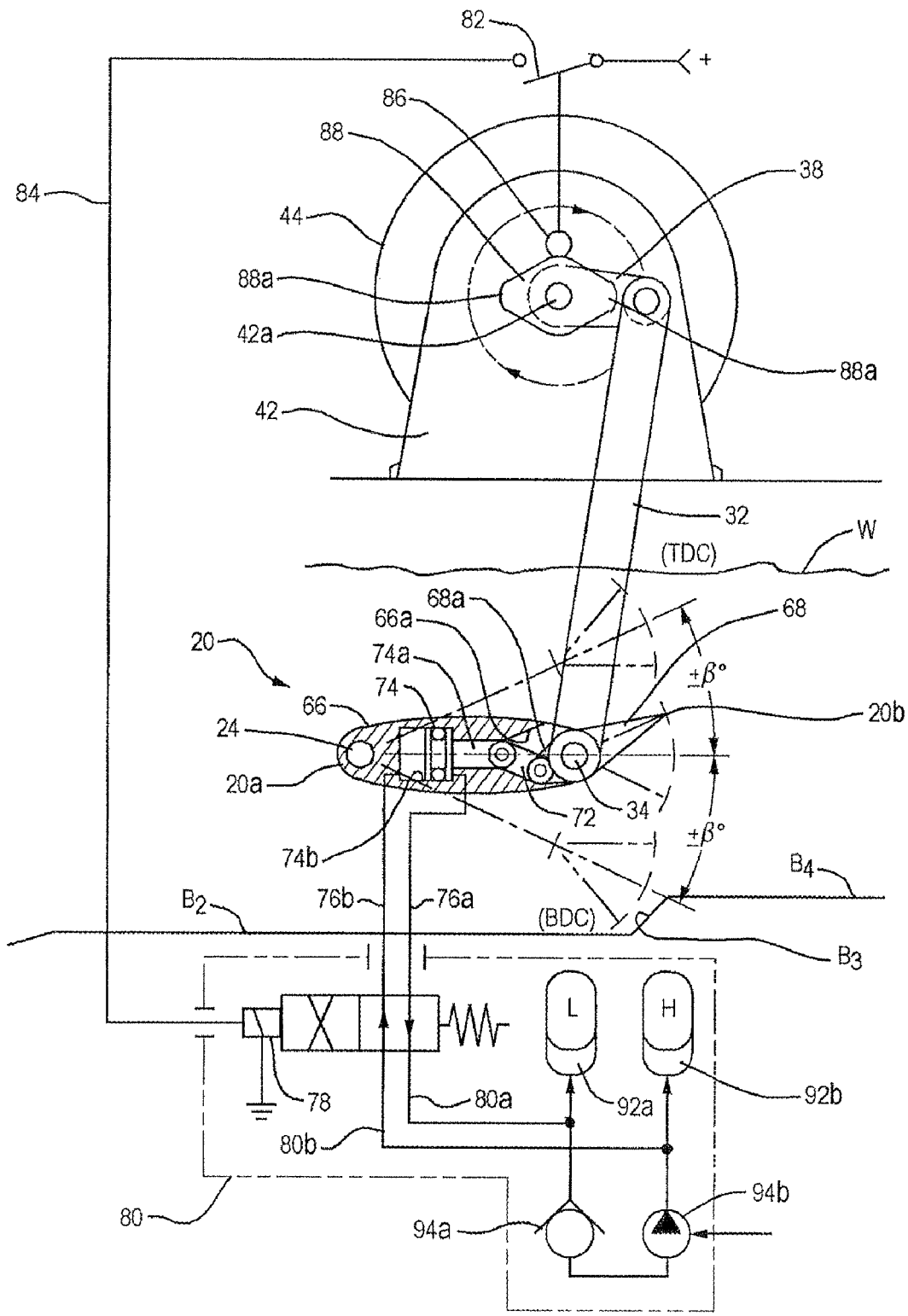
FIG. 4 is a side elevational view with parts in section showing the internal components of the oscillating blade.

More particularly, as shown in FIG. 4, the flap has an inner end 68a that extends beyond shaft 34 into main body 66 which is notched or hollowed out at 66a to provide clearance for the swinging motion of the flap end 68a. Flap end 68a is pivotally connected to the one end of a link 72 whose other end is pivotally connected to a linear actuator 74 which, in the illustrated embodiment, comprises a piston 74a which moves along a chamber 74b in main body 66. A given blade 20 may have one or more such linear actuators spaced along its length depending upon the length of the blade, all of which act in unison to pivot the flap 68 between its two operative positions.

The chamber 74b volumes on opposite sides of piston 74a are connected by pipes 76a and 76b, respectively, to the two fluid channels of a spring biased, two position solenoid, fluid or mechanically-operated valve 78 which may be part of a module 80 preferably contained within main body 66. Those two channels of valve 78 are also connected to a pair of pipes 80a and 80b. Pipe 80a leads to a low (L) pressure accumulator type vessel 92a while pipe 82b leads to a high (H) pressure accumulator type vessel 92b. If desired, vessels 92a and 92b may be connected via a check valve 94a, and an electric, fluid or mechanically actuated, motor-powered make-up pump 94b so that the liquid in the high pressure accumulator-type vessel 92b may be replenished at a selected level with the liquid from the low pressure accumulator-type vessel 92a. Thus, valve 78 can deliver fluid under pressure to and vent it from pipes 76a and 76b, respectively, depending upon the position of the valve. This results in the delivery of fluid, e.g. oil/water, to chamber 74b on one side of piston 74a or the other side thereof resulting in the actuator 74 switching between an extended position and a neutral position. When the piston 74a is extended, it maintains flap 68 in one of its two positions; when the piston is retracted it moves flap 68 to its neutral position. Valve 78 is spring-biased to the position shown in FIG. 4 so that piston 74a is maintained in one of its extended positions, e.g. the upper position in that figure.

Valve 78 is switched to its other position by a switch 82 which, when closed, applies a signal on a wire or pipe 84 to valve 78. In lieu of a switch a valve or cam follower may be used to actuate the valve. In this other position, valve 78 applies high pressure oil/water from vessel 92b to pipe 76a while venting pipe 76b to pressure vessel 92a. This causes piston 74a to retract within chamber 74b thereby swinging flap 68 to a neutral position. When the signal to valve 78 ceases, the valve returns to its home position so that high pressure air is applied to cylinder 74b so as to extend the piston 74a. That extension toggles flap 68 to its other, i.e. lower, position where it is maintained by actuator 74 until another signal is applied to valve 78.

Switch 82 or its above equivalent is closed by a cam follower 86 which engages a cam 88 mounted to rotate with the input shaft 42a of gear box 42. As shown in FIG. 4, cam 88 has two lobes 88a which are parallel to the axis of crank arm 38. Thus, these lobes cause switch 82 to close momentarily when crank arm 38 is pointing up or down, i.e. when blade 20 is near its TDC or BDC position. In other words, flap 68 is a bistable member which is toggled from one position to the other only when blade 20 is either near its TDC or its BDC position.

The maximum deflection angles of the blade 20 and its flap 68 are made to be approximately equal so that when the downwardly moving blade 20 shown in FIG. 4 reaches its neutral position in that figure, before the flap switches to its lower bistable position, it is nearly horizontal, or more generally is parallel to the free stream flow direction. As the blade 20 and flap 68 approach the BDC position, the gap between the blade 20 the flap 68 and the floor of the river bed sections $B_2$ and $B_3$, is progressively decreasing. The momentum of the fluid up river and down river of this position causes the fluid's velocity to momentarily proportionally increase as it flows through this narrowing gap creating lower pressures on the bottom surface of blade 20 and even low pressures on the bottom surface of flap 68 especially near its tip. At the same time that this low pressure condition is occurring on these bottom surfaces, the top surfaces of the blade are experiencing progressively higher pressures for the opposite reason because the gap between the top of the blade 20 including flap 68 and the water's surface or opposite boundary is progressively increasing at this time and in this region causing the flow over the top surface as it passes the leading edge to slow down, resulting in higher surface pressures. These pressure differences are magnified as they are proportional to the difference of the velocities squared.

In addition, the flap 68 at this moment has its own inertia, angular momentum and gravitational forces trying to push it down. If the actuator 74 for the flap 68 is unlocked just before the blade reaches BDC, all of these forces combine to push the flap 68 past its neutral point, even in the face of the onrushing fluid, at which point the function of the actuator 74 is mostly to relock the flap and to cushion its motion, although it has the extra hydraulic force available to nudge the flap to its full second position if required.

Once flap 68 suddenly flips to its down position shown in FIG. 4, it immediately blocks the whole bottom half of the river's flow. If this sudden stoppage were to occur in a closed pipe, it would be called the Water Hammer Effect and is known to be powerful enough to rupture heavy steel walled penstocks. In this case, the effect is not as severe, but it is still substantial and its shock force is inversely proportional to the speed of flap switching. The momentum of the fluid up river and down river now suddenly causes the whole flow of the river to temporarily divert to flow over the top of blade 20 and flap 68, momentarily causing higher velocities and lower pressures there. These forces are magnified as the net pressures are proportional to the difference of the square of the fluid velocities. The shock wave of this Water Hammer Effect combined with the simultaneous high pressures from the stopped flow on the bottom surface of blade 20 and the accelerated flows and lower pressures on the top surfaces of blade 20 create a powerful torque pivoting the blade 20 towards TDC. Nearer midstroke, these initial impulses at BDC are further aided by the very powerful more conventional lift forces which pre-dominate there.

Similarly, when the blade 20 with its now downwardly angled flap approaches its TDC position in that figure, cam 88 will again close switch 82 or is equivalent causing valve 78 to momentarily retract piston 74a. Resultantly, flap 68, assisted by the water flow pressures, its own inertia and angular momentum, will be flipped up relative to main body 66. The forces and the flows at TDC are identical to those happening at BDC except that the gravitational force acting on the flap 68 acts against its flipping and the solid river bed sections $B_2$ to $B_4$ are replaced by the open air/water interface surface. The actuator 74 is sized to compensate for the now opposing gravitational force. The upswitching flap 68, combined with the upriver fluid momentum, causes a linear fountain to momentarily appear from river bank to river bank, which is good for aeration of the water and for stunning visual effects. The blade 20 now reverses direction and swings back toward its BDC position, with less torque than from the BDC Water Hammer Effect, but aided now by gravitational forces. Of course, these gravitational forces can be eliminated if desired, by careful attention to the design of the buoyancy of the blade 20 and or its flap 68.

In the apparatus illustrated in FIG. 4, vessels 92a and 92b are conventional accumulators which typically have a sealed internal nitrogen gas pressurized bladder pressing against a working fluid such as oil or water, all contained within a steel shell located in module 80. The actuator 74 may be actuated many times by valve 78 before the high pressure fluid charge in vessel 92b gets transferred to the low pressure vessel 92a; with this arrangement, the electrically, fluidically or mechanically-powered makeup pump 94b transfers fluid from the low pressure vessel 92a to the high pressure vessel 92b to maintain enough fluid therein to operate the actuator 74.

As the blade 20 swings up from BDC, the flywheel 56, if present, starting at zero angular velocity, accelerates, accumulating energy proportional to the square of its angular velocity until the blade reaches midcycle when it starts to slow down, releasing and transferring all of this energy to the output crankshaft by the time the blade reaches TDC; then it reverses and does the same thing on the blade downstroke. Resultantly, when the blade 20 of apparatus 10 is exposed to water flowing at a given rate, the blade will complete each oscillation cycle in a selected amount of time depending upon the load.

To control the generator speed to some prechosen line electrical frequency and/or to match the output power of the generator to the desired load, in some applications, it may be desirable to vary the output power and/or the cycling speed of the apparatus for one reason or another. There are two basic ways to do this and they can be used either singly or together. The first involves raising or lowering the height of the inflatable dam 12 via control valve 16 to vary the velocity of the output flow, but this arrangement can be relatively slow to respond. The second technique reflected in FIG. 5 (and FIG. 12) is more responsive. In the apparatus illustrated there, the user has the option of changing the speed and or power generated by the machine by progressively reducing the maximum angle of deflection of the flap 68. This overrides the substantially fixed period of a complete cycle of blade 20 between its TDC and BDC positions, assuming a substantially constant flow rate of water W, thereby reducing the above described Water Hammer Effect, the Venturi forces and the lift forces simultaneously and proportionally.

As shown there, the piston 74a is connected to a shaft 96, which is slidably received in a second piston 98 able to reciprocate in a second, slave cylinder 98a in main body 66. Shaft 96 has an enlarged head 96 which may engage the left side of piston 98 and functions as a stop. Piston 98 is biased by a spring 100 to the right in FIG. 5. A pipe 102 is connected to the volume of slave cylinder chamber 98a on the opposite side of piston 98 from spring 100 which pipe leads to the output of a master cylinder piston pump 104 whose upwardly biased plunger 104a is terminated by a cam follower 105.

The vertical position of the follower is controlled by a cam 106 which may be rotated by a lever arm 108. Arm 108 may be progressively swung between a HIGH position wherein the cam follower 105 is opposite a low point of the cam 106 so that master cylinder pump 104 delivers little or no fluid to cylinder 98 in blade 20. Resultantly, actuator toggles flap 68 between its two maximum positions as described above.

On the other hand, when the control handle 108 is swung progressively toward its LOW position, the high point on cam 108 causes master cylinder pump 104 to deliver progressively more fluid to slave cylinder 98, offsetting the bias of spring 100 so as to adjust the position of shaft head 76a and thus the stop position of piston 74a so that piston 74a may be maintained in a partially or completely retracted position. This feathers flap 68 to a progressively greater degree which, in turn, reduces the lift, the Venturi and Water Hammer forces of blade 20 resulting in less power being produced by the apparatus.

Figure 5:
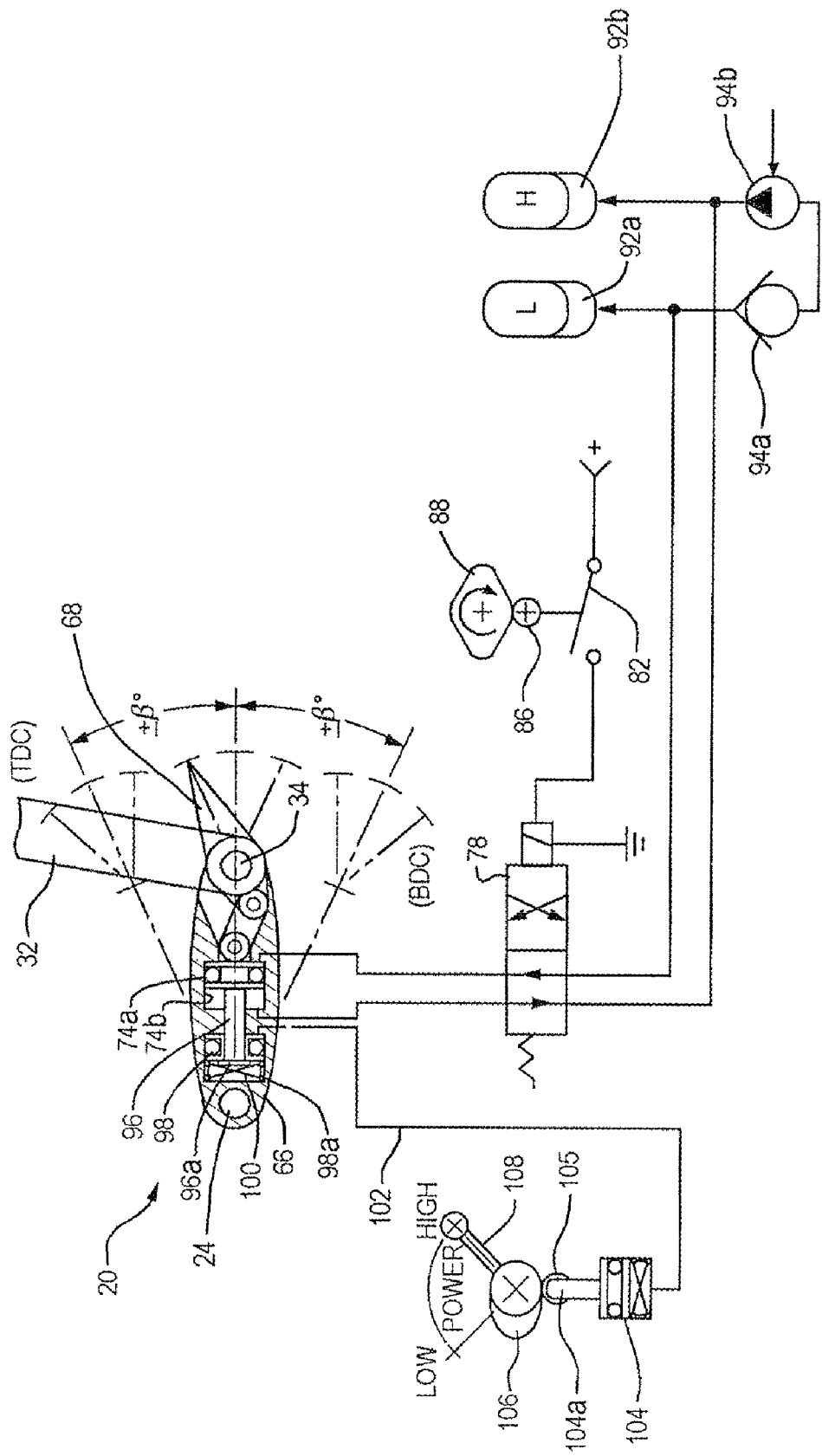
FIG. 5 is a similar view showing another apparatus embodiment with a variable power option.

It should be emphasized that for both the FIGS. 4 and 5 (and 12) control systems, the toggling of the flap 68 at the TDC and BDC positions of the blade 20 is due mainly to net fluid pressures on the blade and flap, combined with the inertial and angular momentum forces as described above. The actuator 74 is mainly for initiation, stopping and smooth speed control of flap 68 and thus of the oscillatory motion of blade 20.

It should be noted that the inflatable dam is not necessary for this machine to function satisfactorily in many applications such as run of the river or irrigation channels and that these machines may be placed sequentially in these types of locations, provided that they are spaced far enough apart that the flows get time to properly renormalize. Further, it should be noted that the mass flows and the potential and kinetic energies of the water W are substantially unchanged passing through this machine, and that there are no known losses from the operation of this apparatus except for the relatively minor frictional and mixing losses which show up as minute temperature increases. Consequently, the normally applied Bernoulli and Euler equations do not predict the work energies that can be extracted from these flows by this machine, as these equations predict that these energies should be zero.

2. Closed Channel Embodiment

Figure 9:
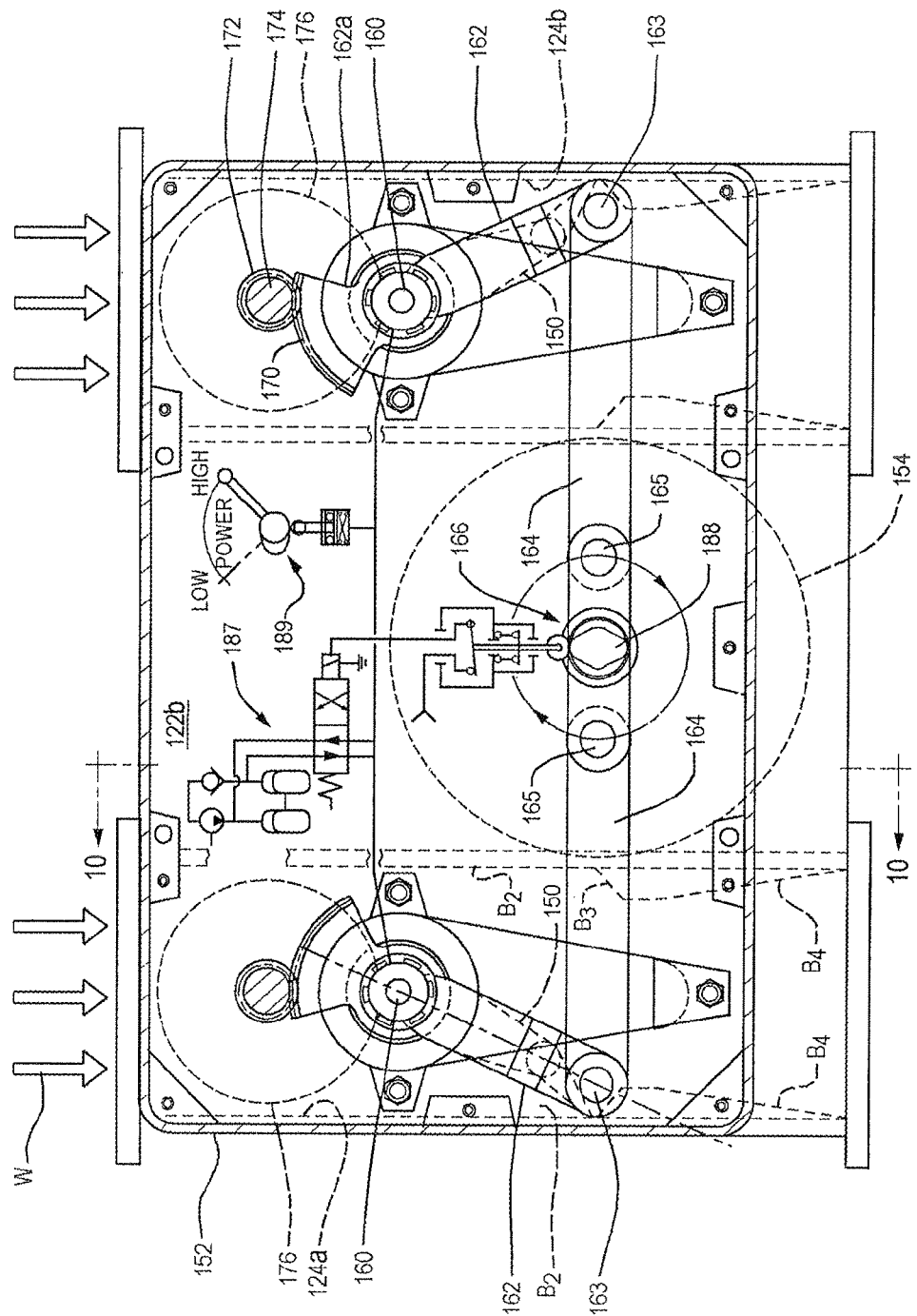
FIG. 9 is a sectional view taken along line 9-9 of FIG. 7.

My basic apparatus can also be used in closed channel, Micro-Hydro applications where water or other fluid is caused to flow through one or more pipes or penstocks. Apparatus such this is shown generally at 120 in FIGS. 6 and 7 implemented as a bolt-on retrofit to an existing dam D across a river, eliminating the requirement for a power house or real estate and civil engineering works along the riverbank, greatly reducing the necessary permits and costs at most locations. In this case, the water trapped by dam D flows through a housing 122 defining two similar, fluid-tight flow channels 124a and 124b. Thus, housing 122 has a pair of inlets 122a which conduct water streams into housing channels 124a and 124b, and a pair of outlets 122b through which these water streams leave the housing. As best seen in FIG. 9, the opposite sides of each channel are profiled to form "bed" sections $B_2$ to $B_4$ comparable to the bed sections described in FIGS. 1 to 3.

Connected to each inlet 122a is a siphon pipe 126 consisting of a flared intake section 126a, an elbow section 126b and a straight penstock section 126c connected in series. A bracket 128 mounted to each elbow section is adapted to engage over the top of dam D so that the intake sections 126a are on the upstream side of the dam and extend well below the water level at the upstream side of the dam. In addition, a bracket 132 mounted to housing 122 may be secured to the downstream side of dam D to support the exit end of the housing 122 at a level below that of the inlet end of the pipe section 126a.

Mounted to each outlet 122b of housing 122 is a draft pipe 134 consisting of an elbow section 134a connected to the corresponding outlet 122b and a flared discharge section 134b connected to elbow section 134a which discharges the flow beneath the level of the water on the downstream side of the dam.

Figure 7:
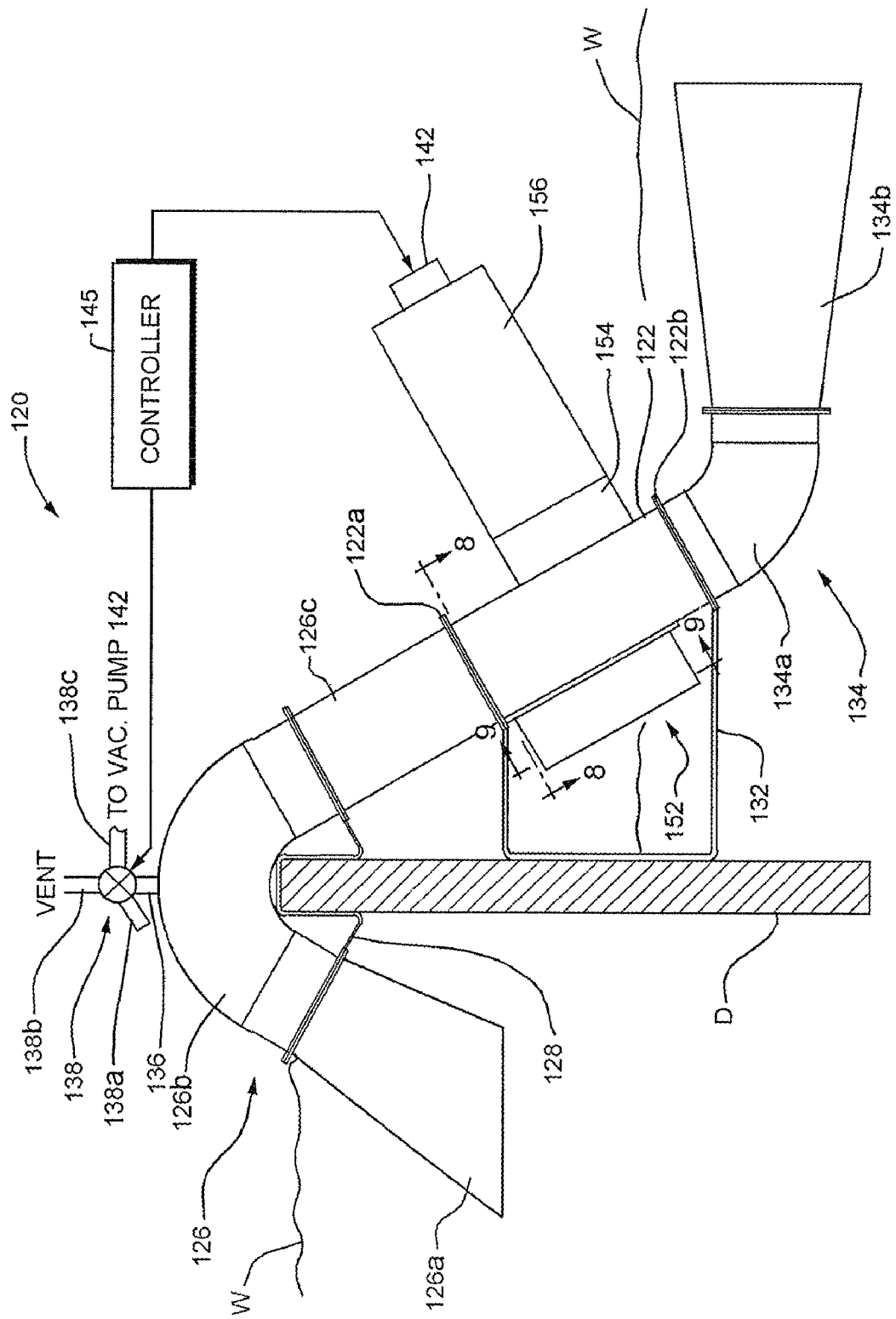
FIG. 7 is a side elevational view thereof.

Referring to FIG. 7, preferably a vent tube 136 is provided at the uppermost part of each siphon pipe, i.e. at pipe section 126b, and a three way valve 138 is installed in each tube. One inlet 138a of that valve is closed, a second inlet 138b is vented to the atmosphere and a third inlet 138c connects to a vacuum pump 142, both the valve and the pump being controlled by a controller 145.

In order to initiate the flow of water through housing 122, the pump 142 is activated and each valve 138 is switched so that the pump pulls a vacuum at each vent tube 136. This draws water into the siphon pipes 126 to initiate the siphoning of water so that water flows down to the flow channels 124a and 124b in housing 122, after which valves 138 may be switched to the closed position. Due to said siphoning action, water will continue to flow through the flow channels 124a and 124b each of which contains an articulated blade shown generally at 150 in FIG. 6. Each blade 150 is similar to blade 20 described above except that it is much smaller and it is mounted so that it swings on an axis perpendicular to the water flow and its containment housing 122 is on an axis approximately 30° above horizontal. In other words, blades 150 extend the full heights of their respective channels 124*a* and 124*b* and they oscillate side to side under the influence of the dual water streams flowing through the housing 122.

The oscillatory motion of blades 150 is converted to a uni-directional torque by a power converter shown generally at 152 mounted to the underside of housing 122 as shown in FIG. 7. The rotary output from the power converter is applied to the input shaft of a gear box 154 mounted to the top of housing 122 and the output shaft of that gear box turns the rotor of a generator 126 mounted to the gear box. That rotating rotor can also be used to drive the vacuum pump 142 which may be mounted to the end of generator 156.

When it is desired to stop the flow of water through housing 152 and thus the generator 156 output, the valves 138 may be switched by controller 145 so that tubes 136 are vented to the atmosphere through valve inlets 138*b*. The venting of the siphon tubes 136 in this fashion will interrupt the siphon action and thus stop the further flow of water into the housing 122. If desired, restrictive venting of the vent tubes 136 can be used to control the flow of water through the apparatus and thus the power generated by generator 156. For example, controllable flow restrictors (not shown) may be installed at the valve inlets 138*b* and controlled by controller 145 to allow a selected amount of air to be introduced into vent tubes 136 to control the flow of water through the siphon pipes 126. If the apparatus 120 is operating near cavitation pressures, it will be more desirable to introduce this flow control air at the exit side of the apparatus near the center of elbow 134*a*.

Figure 6:
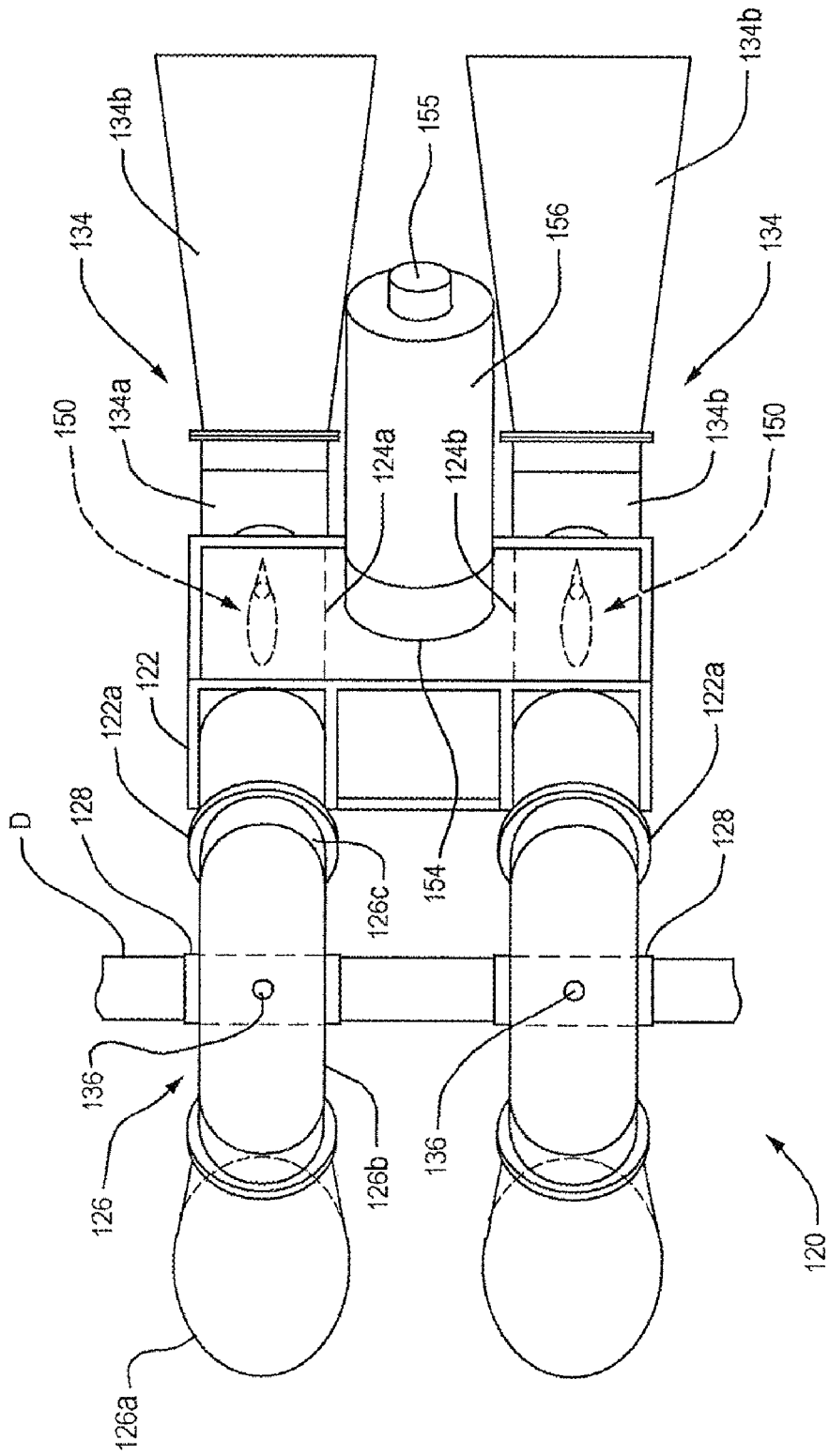
FIG. 6 is a top plan view of my apparatus adapted for closed channel hydro applications.

The apparatus illustrated in FIGS. 6 and 7 is designed particularly for low pressure head applications, i.e. less then ten meters. Preferably, the overall length of the apparatus 120 varies with the height of dam D which height determines the flow velocity through the apparatus and the necessary gear ratio of the gear box 154 to drive generator 156 to produce the desired frequency of output power. As noted previously, for maximum power, the flow exit from housing 122 as well as the power converter 152 should be near the level of the water W on the downstream side of the dam D. Also for maximum efficiency, the draft tubes 134 should be designed to recover the siphon-velocity energy at the outlet end of housing 122 converting it into negative gage pressure down to the approximate vapor pressure of water. This maximizes the water's velocity through the housing 122 and thus the harvestable power from the water.

For all of those applications that do not involve dams and where a fluid flow velocity is already established within a pipe(s), such as in drainage, waste or fresh water piping systems, the siphon and draft pipes would, of course, not be required. Although a closed system with only one large channel through housing 122 is possible, dual channels are generally preferred to mechanically balance the oscillating blades 150 as well as to maximize the energy recovery through the draft pipes 134, if they are used, and to minimize reduction of the power recoverable from the apparatus due to turbulence.

Figure 8:
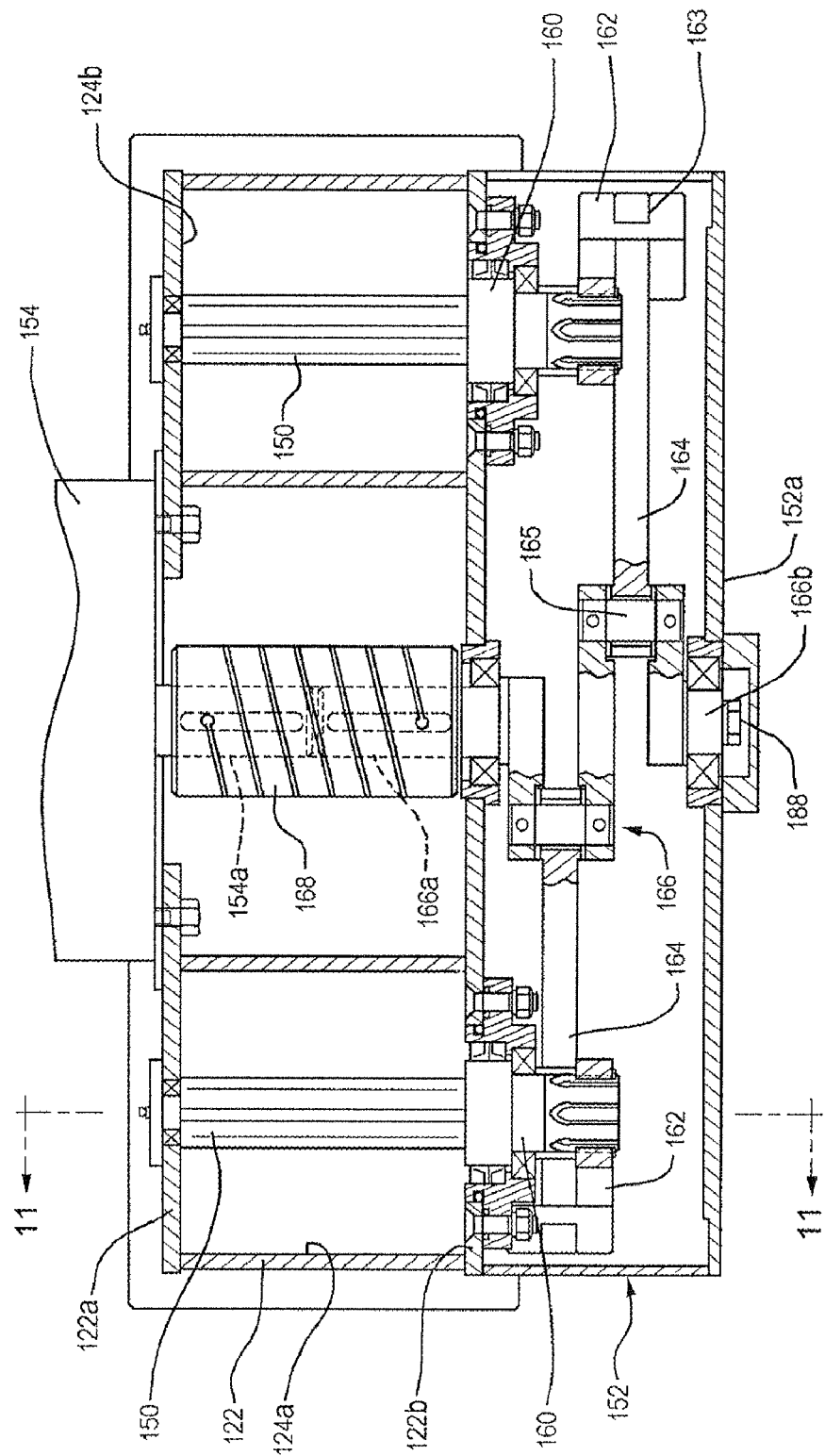
FIG. 8 is a sectional view taken along line 8-8 of FIG. 7.

Referring FIGS. 8 and 9, in this dual channel embodiment of the apparatus, the oscillating blades 150 are pivotally mounted in channels 124*a* and 124*b* of housing 122 by way of shafts 160 which may extend the lengths of the blades adjacent to their leading edges. Alternately, stub shafts may be present at the upper and lower ends of the blades. In either event, the shaft ends are journalled in the upper and lower walls 122*a* and 122*b* of the housing. Since the blades 150 are identical, we will use the same numbers to identify their parts. Thus, the lower end of each blade shaft 160 extends through the sealed housing lower wall 122*b* into the power converter assembly 152 where it is connected to one end of a crank arm 162 that is also pivotally connected at 163 to one end of a link 164. The opposite end of that link is pivotally connected at 165 to one lobe of a two-lobe crank shaft 166 whose upper and lower ends 166*a*, 166*b* are journalled in the housing wall 122*b* and a housing wall 152*a* of assembly 152, respectively. In other words, the two links 164 connect to the two 180° out-of-phase lobes of the crank shaft 166.

The crank shaft upper end 166*a* extends through wall 122*b* into housing 122 where it is connected by a coupling 168 to the input shaft 154*a* of gear box 154. As we shall see, the two blades 150 are arranged to oscillate 180° out of phase so that they crank the crank shaft 166 in tandem causing unidirectional rotation of the crank shaft and the gear box shaft 154*a* connected thereto.

Figure 10:
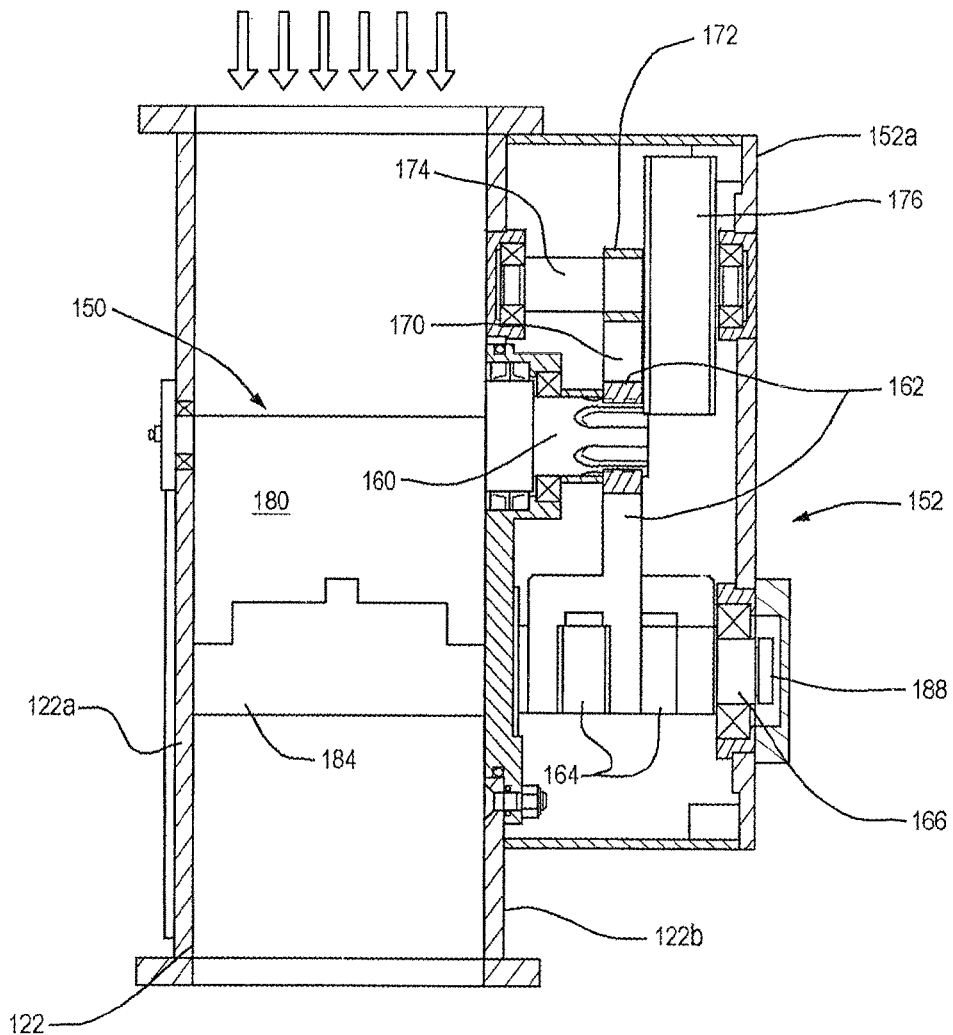
FIG. 10 is a sectional view taken along line 10-10 of FIG. 9.

Referring now to FIGS. 9 and 10, in this dual channel version of my apparatus, an inertial device similar to the one depicted in FIG. 3 is associated with each oscillating blade 150. More particularly, each crank arm 162 has an end extension 162*a* on the opposite side of its shaft 160 from the associated link 164. That extension carries an arcuate rack 170 which meshes with a pinion 172 on a shaft 174 rotatably supported between housing wall 122*b* and the wall 152*a* of assembly 152. Shaft 174 carries a flywheel 176 which is rotated in one direction or the other by the oscillatory motion of the associated blade 150. Thus, each flywheel 176 captures the energy of its oscillatory blade 150 at the opposite ends of the blade excursion and releases that energy nearer to the middle of the oscillation half cycle of the blade in the same manner described above in connection with the FIGS. 1 and 2 invention embodiment. Thus it supplements the rotational inertia provided by the generator 156 rotor via gear box shaft 154*a*.

Figure 11:
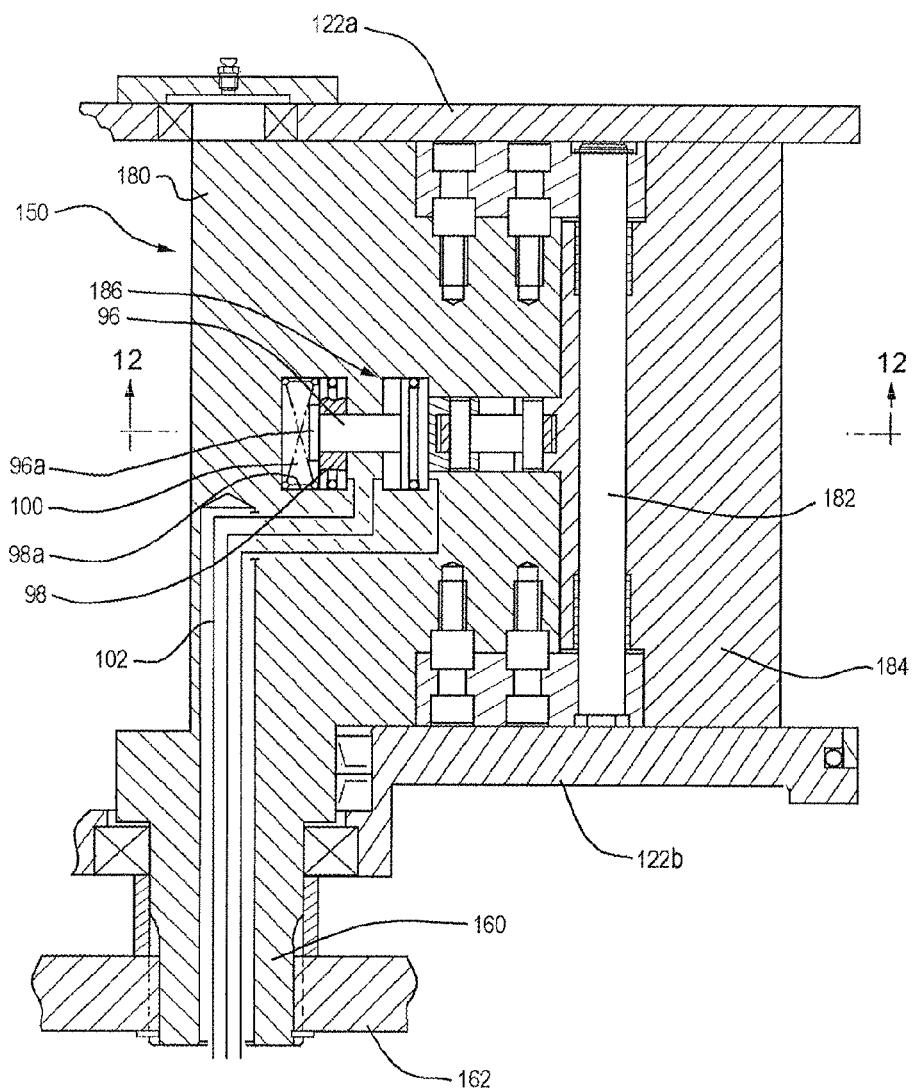
FIG. 11 is a sectional view taken along line 11-11 of FIG. 8.
Figure 12:
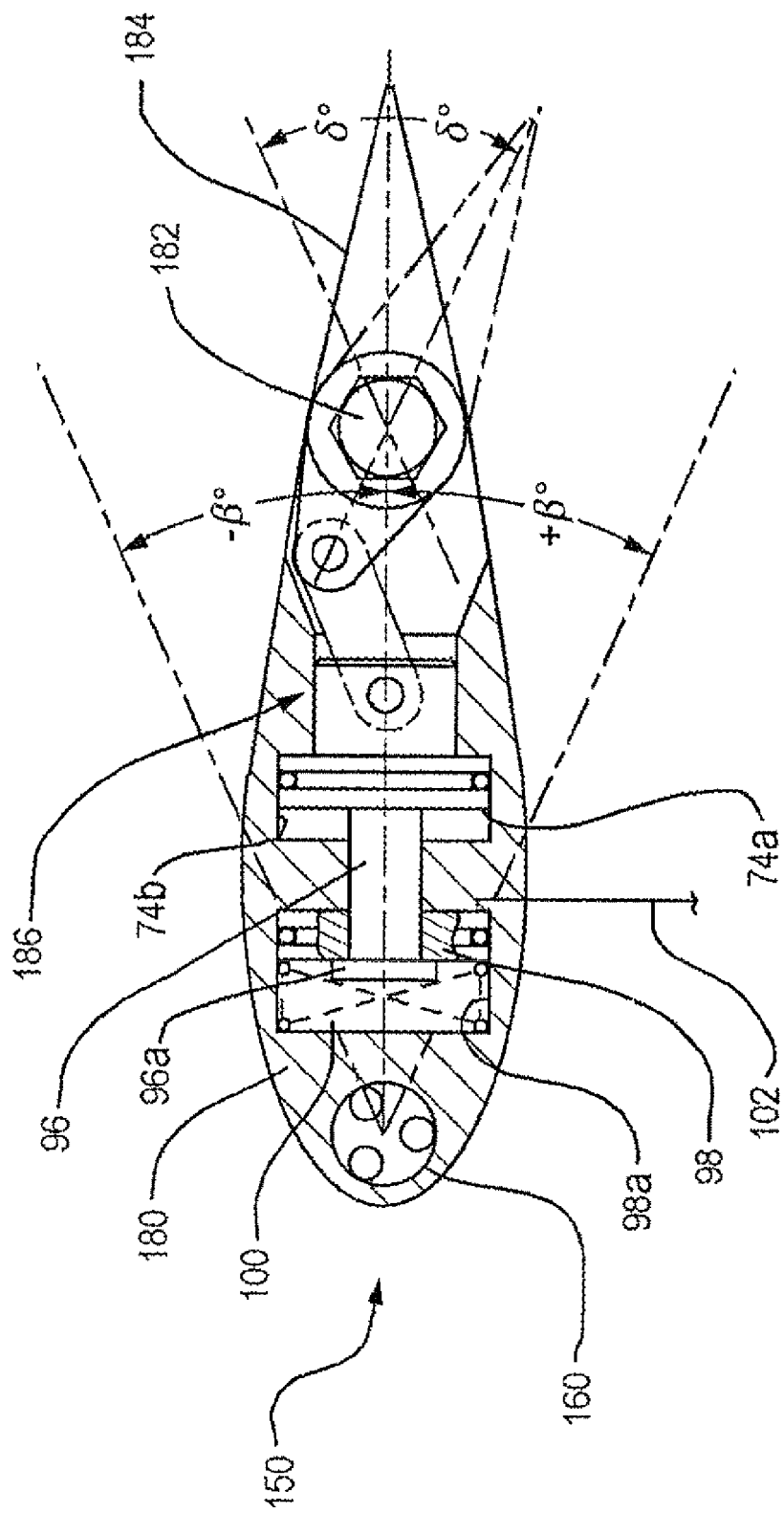
FIG. 12 is a sectional view taken along line 12-12 of FIG. 11.

Refer now to FIGS. 11 and 12 which show a blade 150 in greater detail. The blade is shaped more or less like an airplane wing having bilateral symmetry. It comprises a main body 180 having a leading edge along which shaft 160 extends and a trailing edge connected by a shaft 182 to a flap or aileron 184 which can pivot on shaft 182 independently of the angular position of the main body. Flap 184 is a bistable member which can be swung between two extreme positions by at least one toggling mechanism indicated generally at 186 located inside main body 180. The toggling mechanism 186 may be substantially identical to and operate in the same way as the one depicted in FIG. 4 or 5.

Further, as shown in FIG. 9, power converter assembly 152 may include a module 187 similar to module 80 to control toggling mechanisms 186 so that they flip the flaps 184 at the extremes of the blade excursions as determined by the position of a cam 188 at the lower end of crank shaft 166. The illustrated apparatus includes a variable power option indicated generally at 189 similar to the one illustrated in FIG. 5. Accordingly, the blade 150 shown in FIGS. 11 and 12 has a second slave cylinder 98*a* and piston as described in connection with blade 20 in FIG. 5.

Figure 13A:
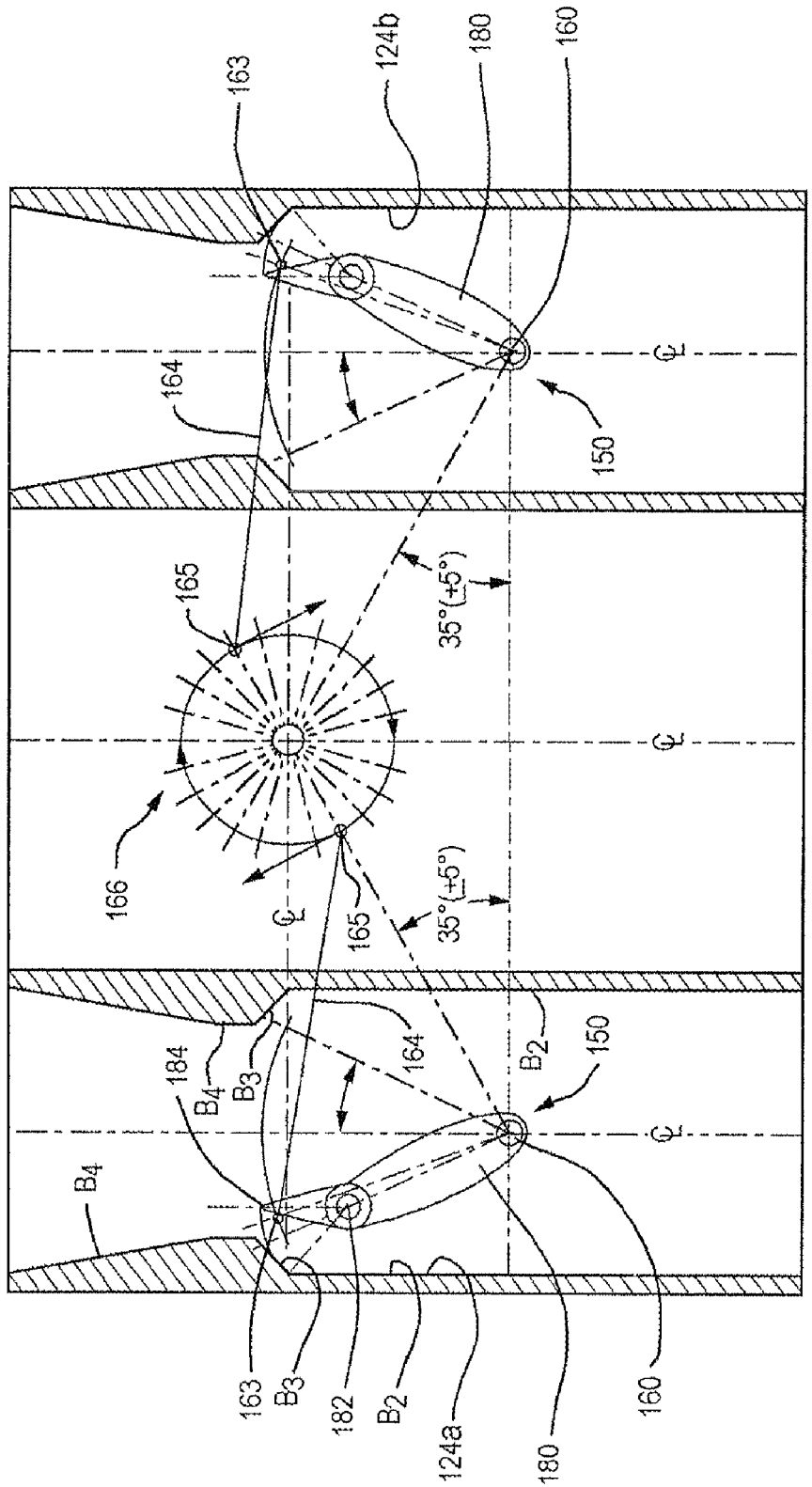
FIGS. 13A and B are schematic diagrams illustrating the operation of the FIGS. 6 and 7 apparatus.

Refer now to FIG. 13A which is a schematic diagram showing blades 150 which are oscillated on their shafts 160 180° out of phase by the crank shaft 166 connected to the blades by links 164.

Under the influence of the water flow, each blade 150 oscillates within its channel 124*a*, 124*b* between extreme positions wherein its flap 184 is adjacent to the bed sections $B_2$-$B_4$ at opposite sides of its channel. At those extreme positions, the water flow, the blade and the beds interact to produce a Water Hammer Effect that causes a sudden blade swing reversal, all described above in connection with FIG. 4. Thus each blade 150 functions more or less in the same way and produces the same results as the one in FIG. 4 except that the blades 150, being vertical, are not affected by gravity. It has been found that the closed channel embodiment of my apparatus employing dual flow channels as well as the wind powered version of the apparatus about to be described operate best when the pivot axes of the two blades at 160 define the base of triangle whose apex is the axis of rotation of the crank shaft 166 and when the base angles of that triangle are about 35° +/−5° and the pivotal connections 165 of the links 164 with the crank shaft line up with the sides of that triangle when the blades are in their TDC and BDC positions, all as shown in FIG. 13A at the TDC and BDC ends of the strokes. Also, the crank centerline C/L, parallel to the base of this triangle, should pass through the link/blade connections 163 as shown in FIG. 13A. This results in the two blades 180 being in close dynamic balance throughout their oscillation cycle so that they swing smoothly between their two extreme positions. In the FIG. 13B graph, the right hand vertical scale at the left side of the graph displays the velocity of a blade 150 of a typical machine in meters per second per cycle per second (m/s/cps) of the crankshaft 160 of the machine verses the crank angle α in degrees of rotation of the crankshaft, while the left-most vertical scale shows in meters per second (m/s), the rim velocity of the corresponding oscillating flywheel 176 (or the surface velocity of an associated Magnus roller to be described later), whichever blade is used with this particular machine. All of my machines have similar velocity curves and this evidences the smooth sinusoidal motion of each blade 150 over its entire oscillatory cycle.

3. Total Immersion Embodiments

Figure 14A:
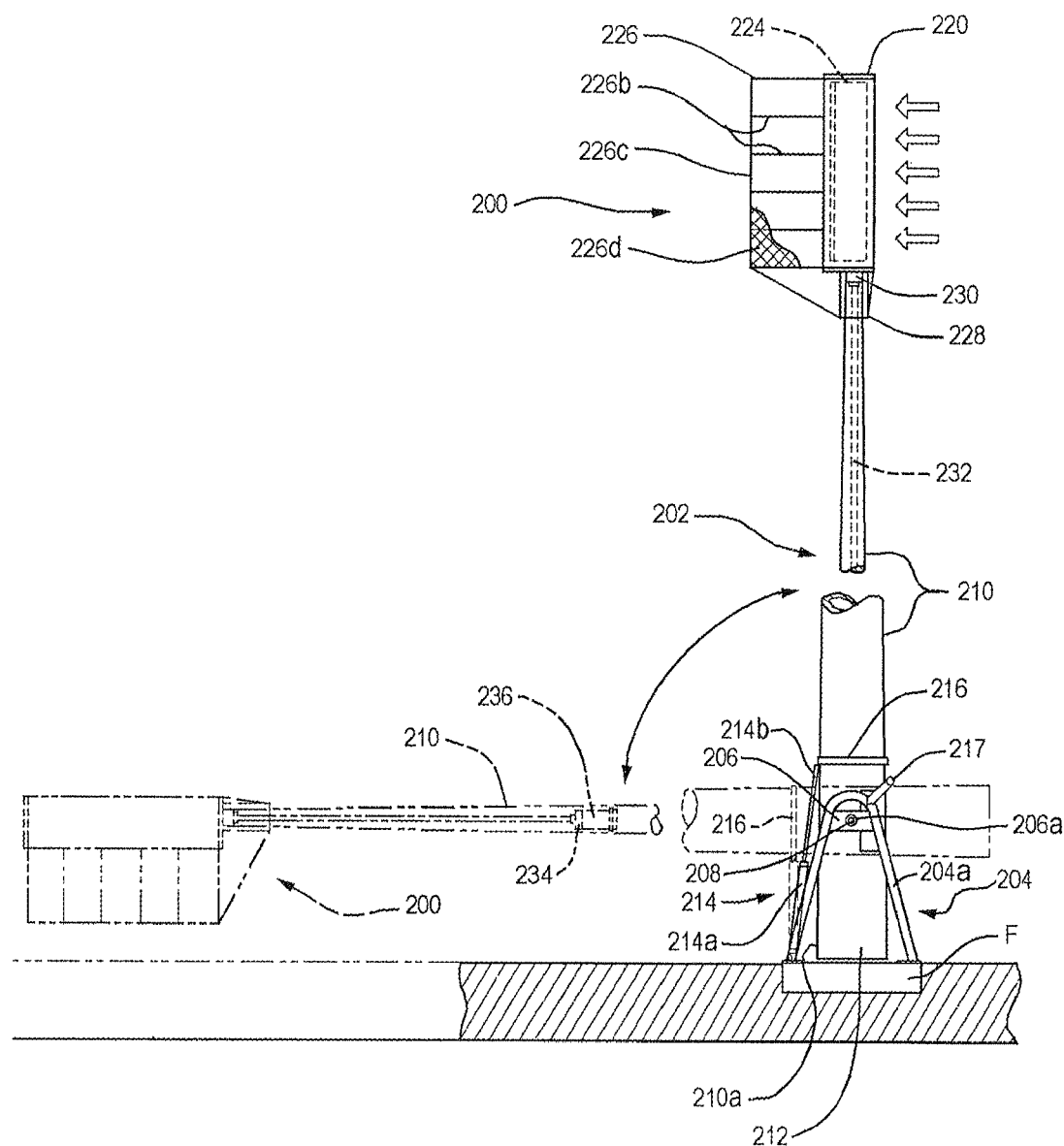
FIG. 14A is a side elevational view of my apparatus as adapted to extract energy from the wind to produce electrical power.
Figure 14B:
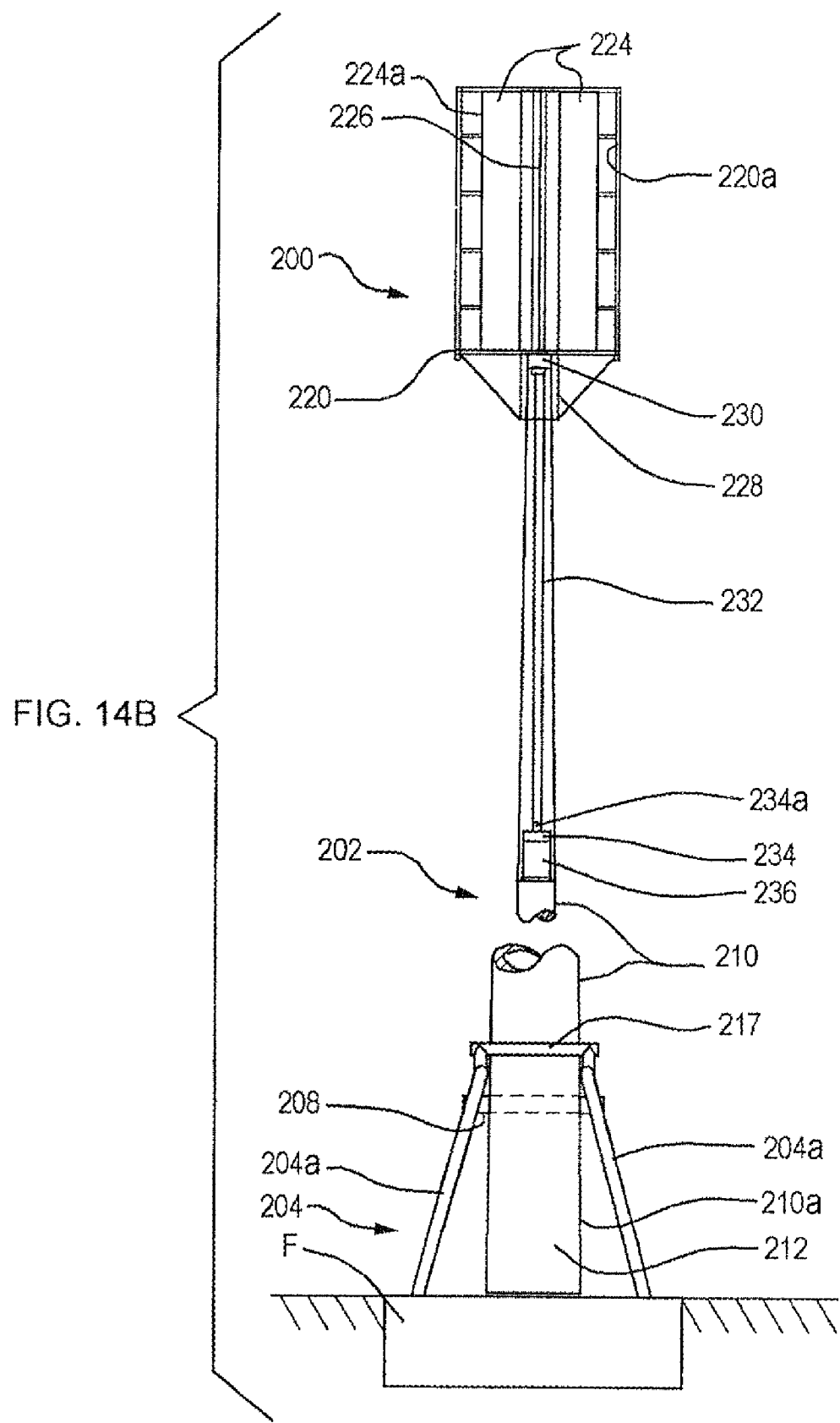
FIG. 14B is a front elevational view thereof.

Refer now to FIGS. 14A and 14B which show an apparatus embodiment 200 preferably mounted atop a support structure 202 and adapted to be driven by wind power. That is, it is totally immersed in essentially an infinite flow field, in this case, the atmosphere.

Structure 202 comprises a base indicated at 204 mounted on a firm foundation F. Base 204 is a tubular structure composed of a pair of spaced-apart, upwardly bowed side rails 204a whose lower ends are anchored to foundation F. A plate 206 is connected between the legs of each side rail near the top of that rail and the plates have bushings 206a that support the opposite ends of an axle 208 which extends between the side rails. Rotatably supported on axle 208 is a long, tapered, tubular tower 210, preferably of a strong, lightweight, weather-resistant plastic, aluminum or steel material.

The lower end segment 210a of the tower that is below axle 208 may define a tank or container 212 for holding water, sand or a heavy metal such that the tower segment 210a constitutes a counterweight to the weight of apparatus 200 at the top of the tower. This allows tower 210 to be swung between a raised position shown in solid lines in FIGS. 14A and 14B wherein the tower supports apparatus 200 high above the ground, and a lower position shown in phantom in FIG. 14A wherein apparatus 200 is close to the ground where it can be serviced relatively easily.

Due to its aforesaid counterbalanced construction, tower 210 may be swung between its two positions by a simple linear actuator 214 which, in this case, comprises a hydraulic or pneumatic cylinder 214a whose lower end is anchored to foundation F at a location thereon spaced approximately perpendicular to axle 208 and a piston rod 214b which slides along cylinder 214a. The upper end of the piston rod is secured to a bracket 216 encircling tower 210 well above axle 208 as best seen in FIG. 14A. The tower 210 is raised by injecting fluid under pressure into cylinder 214a below piston 214b, the fluid being supplied from a conventional pump (not shown).

Preferably base 204 includes a tubular stop rail 217 which extends between side rails 214a just above axle 208 on the opposite side thereof from actuator 214. Rail 217 is shaped and positioned so that it is engaged by tower 210 when the tower reaches its erect position and thus positively defines that upright position. Also, as a safety measure, the pressure of the fluid pumped to cylinder 214a may be limited so that without the counterbalance at the lower end of the tower, the tower cannot be raised. It can still be lowered, however, by venting fluid from cylinder 214a.

It will be appreciated from the forgoing that due to its counterbalanced, tilt up, free standing, tapered tube design, the FIGS. 14A and 14B apparatus is pleasing to the eye and requires minimum real estate because it has a relatively small profile and requires no guide wires. Also, it is easy to service safely because no climbing is ever required to reach its essential parts. In addition, it is less expensive to make then conventional rotary wind powered generators because it does not have to be designed to survive strong winds in that it can be lowered automatically and stowed in the event of same.

Figure 15:
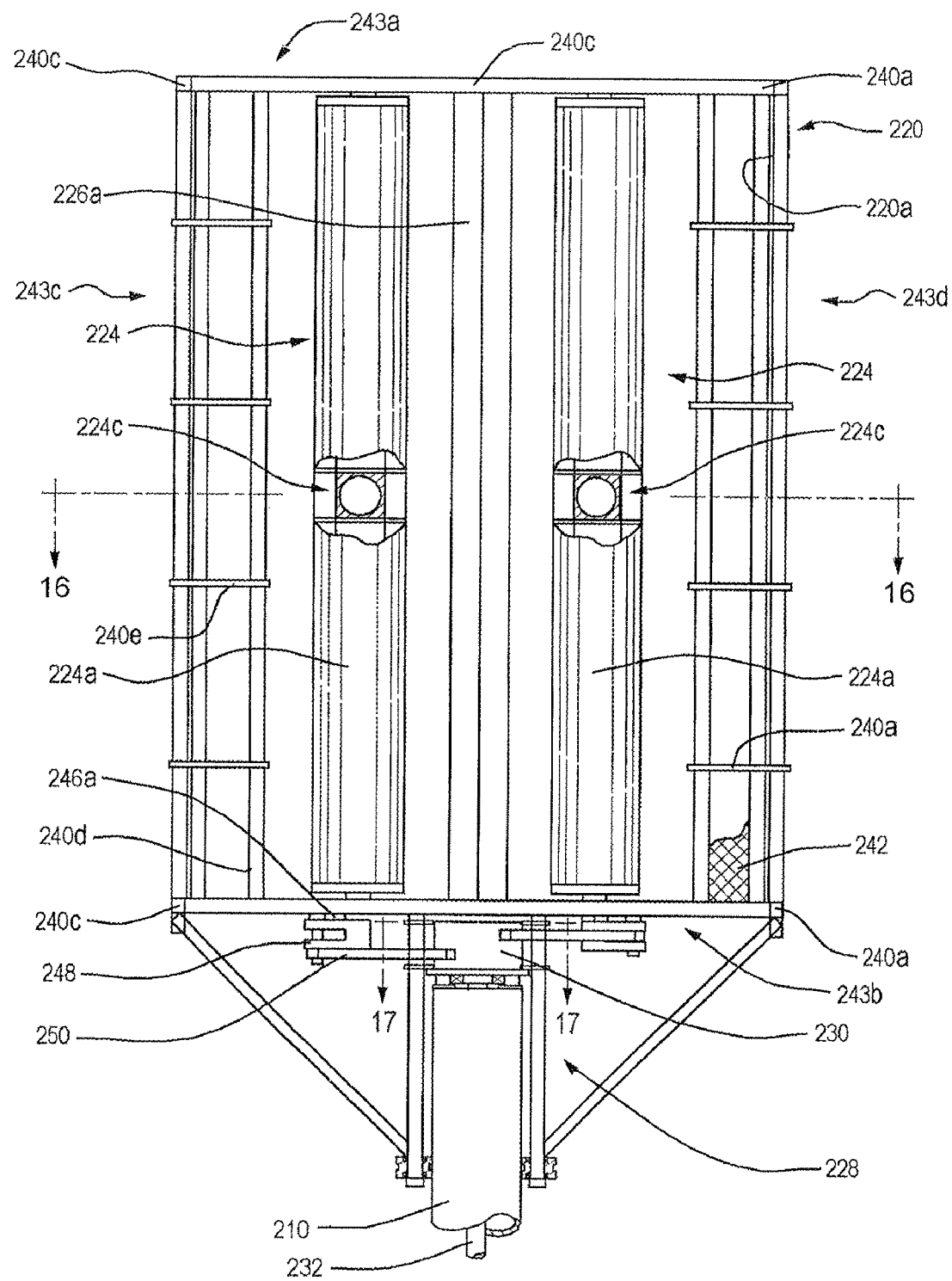
FIG. 15 is a front elevational view with parts in section, on a larger scale, showing the upper segment of the FIGS. 14A and 14B apparatus in greater detail.

Referring to FIGS. 14 and 15, apparatus 200 comprises a housing 220 having an open mouth or entrance 220a as best seen in FIG. 14B. Housing 220 supports a pair of similar, spaced-apart, vertically oriented blades 224. The blades are pivotally mounted with their leading edges 224a facing the housing entrance 220a so that the blades can oscillate side to side. Mounted to the rear of housing 220 opposite its entrance 220a is a large tapered vertical vane 226 having a streamline leading edge bracket 226a centered between blades 224 and extending parallel to the vertical axis of housing 220. Preferably, vane 226 is a light-weight hollow subsection composed of first and second vertical arrays of horizontal ribs 226b. Corresponding first ends of the ribs in the two arrays are connected to bracket 226a while corresponding second ends of the ribs in both arrays are connected to a single vertical rib 226c spaced an appreciable distance from housing 220. The ribs 226b and 226c are covered by a taut skin 226d of a strong, flexible, weather resistant material such as Dacron polyester or other similar sheet material.

Apparatus 220 is pivotally mounted atop tower 210 by way of a kingpin assembly 228 so that the vane 226 orients apparatus 220 with the housing entrance 220a and blade leading edges 224a always facing into the wind as indicated by the arrows in FIG. 14A.

Just as in the FIGS. 6 and 7 apparatus embodiment described above, when exposed to a moving fluid stream, in this case the wind, the blades 224 oscillate side to side within housing 220. This oscillatory motion is coupled by way of a crank case assembly 230 at the base of housing 220 to the upper end of a shaft 232. Housing 220 is made to pivot, by wind forces on the vertical vane 226, about the centerline of the crank shaft 232 so as to always point into the wind, W; this axis is also the centerline of structure 202 and tapered tower 210. The assembly 230 converts the oscillatory motion of blades 224 to a unidirectional rotation of shaft 232. The shaft extends down through tower 210 to turn the input shaft 234a of a gear box 234 whose output shaft (not shown) drives an electrical motor/generator 236 which is rotatably fixed inside tower 210. Preferably the motor generator is an Induction Motor that may be used As a Generator (a.k.a. IMAG). The gear box and generator may be accessed through a service opening in the tower wall.

Figure 16:
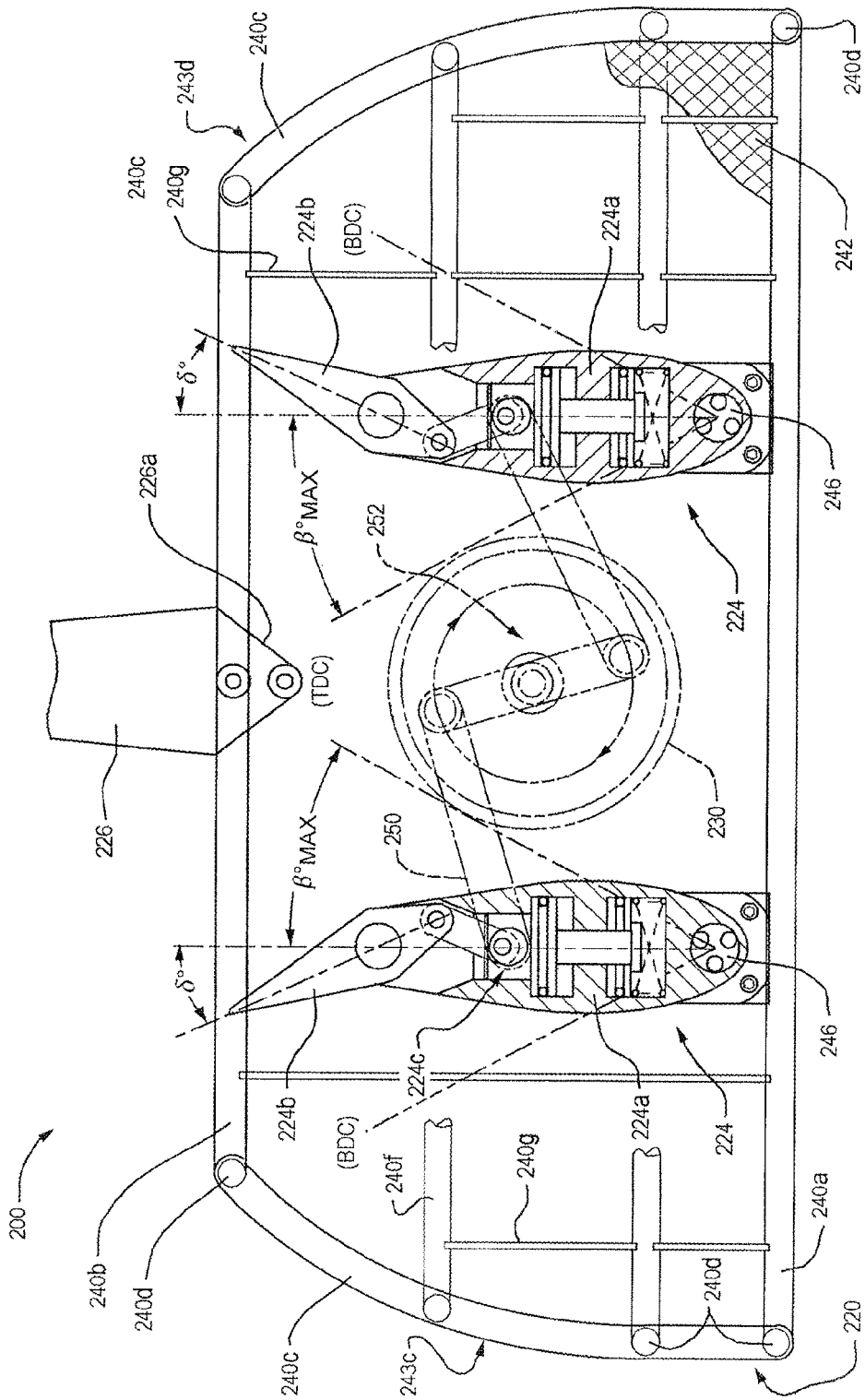
FIG. 16 is a sectional view taken along line 16-16 in FIG. 15.
Figure 20:
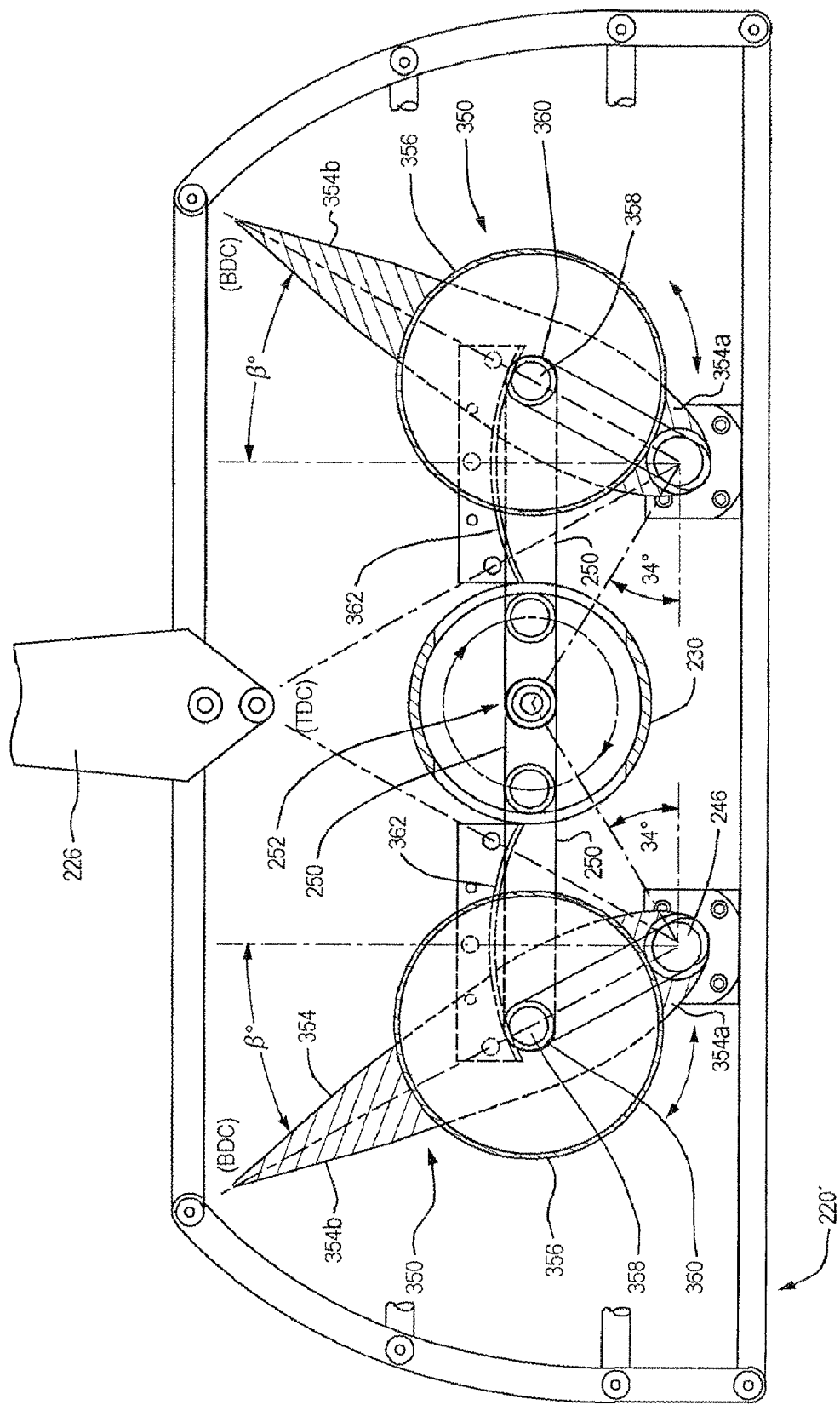
FIG. 20 is a sectional view similar to FIG. 16 showing another apparatus embodiment employing blades with Magnus rollers instead of flaps.
Figure 20A:
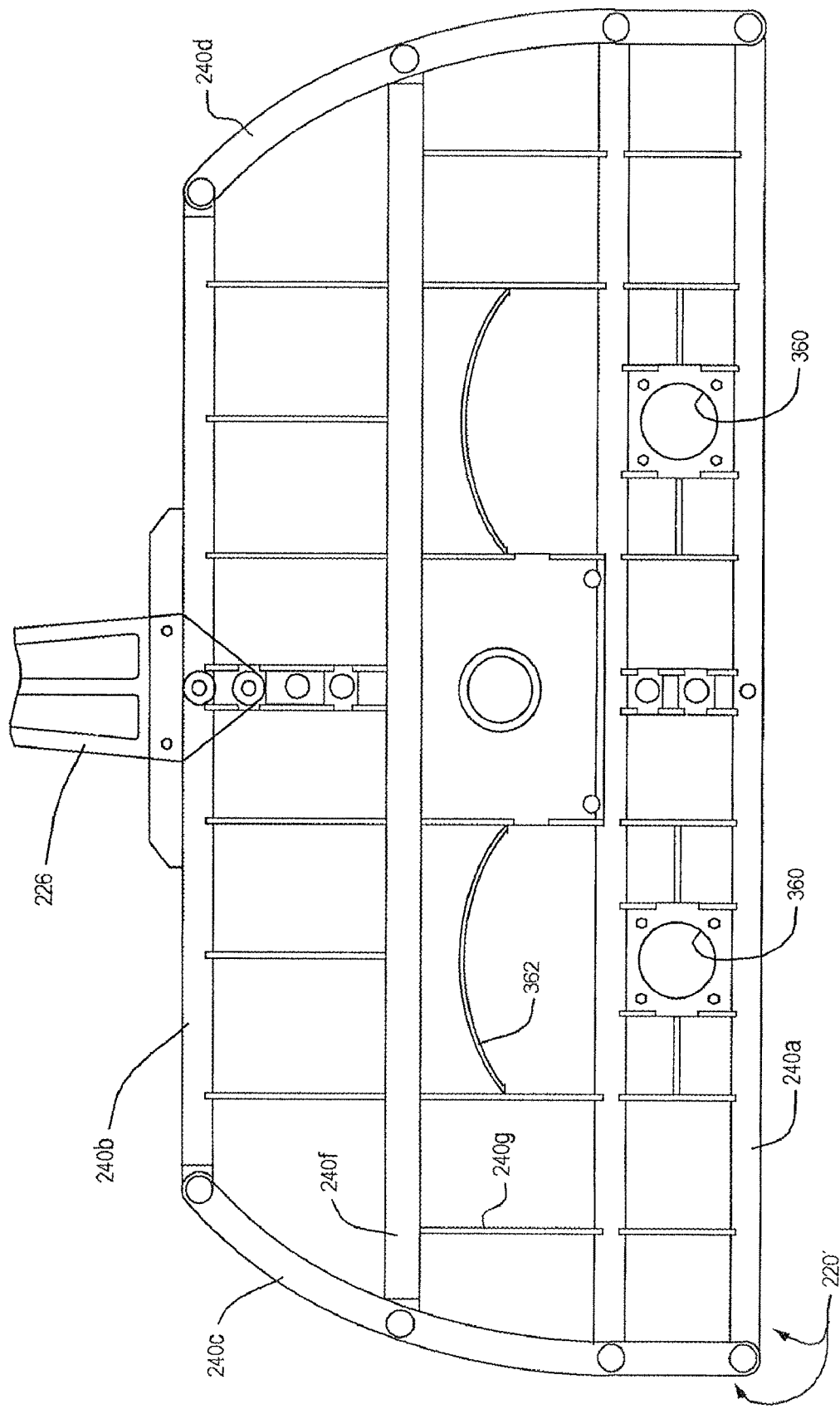
FIGS. 20A and 20B are top plan and front elevational views, respectively, showing the housing of the FIG. 20 apparatus in greater detail.
Figure 20B:
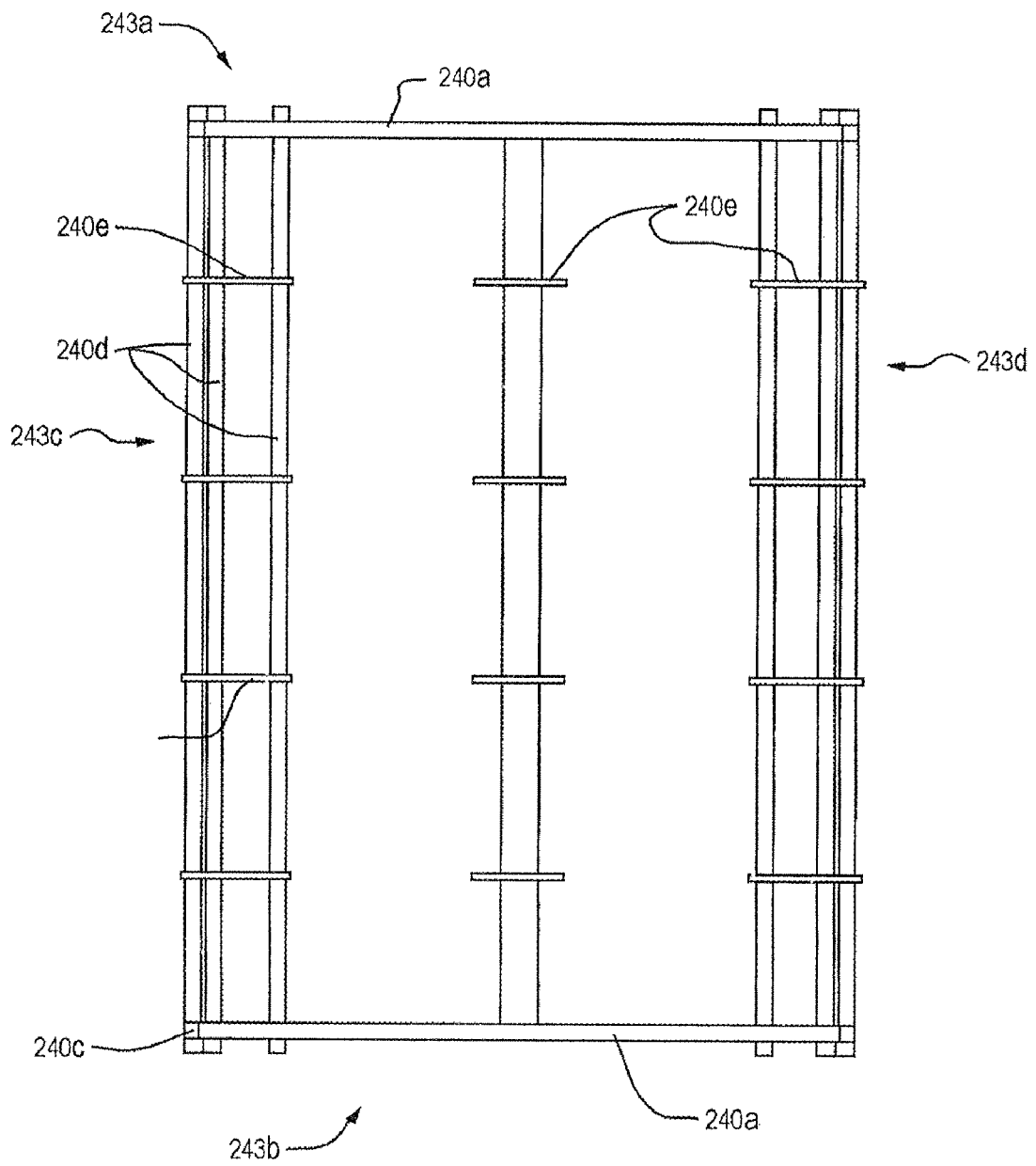

Refer now to FIGS. 15 and 16, the housing 220 is a field-assembled, bolted-together, multisectional unit with lightweight, cage-like, welded or brazed flat panel subsectional skeleton structures formed by a multiplicity of flat, laser-cut straps welded to tubes; see also FIGS. 20A and 20B. Thus, the upper end subsection of the housing is defined by a front horizontal tube 240a, a somewhat shorter rear horizontal tube 240b and a pair of mirror-image side straps 240c connected between the corresponding ends of the front and rear tubes. Substantially identical tubes 240a, 240b and straps 240c define the lower end subsection of housing 220 which is spaced below the upper end by slightly more than the length of blades 224. The side subsections of housing 220 are completed by a plurality of spaced-apart vertical tubes 240d connected, generally by bolts (not shown), between the upper and lower straps 240c and thin horizontal ribs 240e welded to tubes 240d. As best seen in FIG. 16, lateral tubes 240f are connected between side straps 240c at the top of the housing, and fore and aft ribs 240g are welded to those tubes to complete the housing. A mirror image of that structure is connected to the lower set of straps 240c of the housing skeleton. As shown in these figures, the leading edge bracket 226a of the vertical vane 226 is connected between the upper and lower tubes 240b at the rear of the housing at a location therealong that centers the vane between the two blades 224. Preferably, bracket 226a of the vane is pointed or streamlined as shown so that the trailing edges of the oscillating blades 224 can use it as their TDC boundaries, i.e. as bed sections $B_3$.

To complete housing 220, a skin 242 of strong flexible weather-resistant material such as Dacron polyester is stretched over the individual skeleton subsectional structures comprising the top, bottom and sides of the housing 220 and then these subsections are bolted together at the corners forming an enclosure comprising top and bottom walls 243a and 243b as well as opposite side walls 243c and 243d and which directs the air entering the housing mouth 220a past the surfaces of blades 224 and out the rear of the housing past vane 226 subsection. As noted previously, that vane 226 keeps the housing headed into the wind at all times.

Each of the four walls of housing 220 has its own special purpose. More particularly, the top and bottom walls 243a and 243b should be flat and close fitting to the tops and bottoms of oscillating blades 224 as they serve as an aerodynamic "fence", keeping the high pressure regions from "short circuiting" out to the low pressure regions, thereby reducing the desired forces. The side walls 243c and 243d, formed by ribs 240e, are very important, vertically arranged, "thin plate" shaped, static aerofoils formed by ribs 240. These aerofoil sides serve four key purposes, namely: 1) to join the top and bottom walls 243a and 243b physically into a rigid lightweight structure; 2) to bend the surrounding air flow around the large frontal area of housing 220 without "separation", eliminating nearly all form drag possibilities from the structure, thereby greatly reducing the possible wind stress on the tower 210; 3) to create via this bending of the surrounding air flow, a high speed low pressure flow regime directly behind the housing 220 tending to suck the air flow through the housing 220 past the blades 224 and directly negating one of the prime assumptions of Mr. A. Betz regarding his theories regarding the maximum attainable energies extractable from a flowing fluid, and 4) to direct the flow inside the housing towards the blades 224 as well as to serve as the interacting bed or boundary sections $B_2$-$B_4$ described for the hydropower invention embodiments in the above Sections 1 and 2 hereof.

As best seen in FIG. 16, except for scale, the blades 224 may be substantially identical structurally to the blade 150 described above in connection with FIG. 12. Thus, each blade comprises a main body 224a and a flap 224b pivotally connected to the trailing end of the main body. The flap may be pivoted or bent between two positions by a toggling mechanism 224c in the main body. The main body 224a is swingably supported within housing 220 by a vertical shaft 246 which may extend the length of the blade or by comparable upper and lower stub shafts. The lower end 246a of each shaft is connected to a lever arm 248 and the free end of that lever arm is pivotally connected to one end of a link 250 whose other end extends through an opening in the side of crank case assembly 230.

Figure 17:
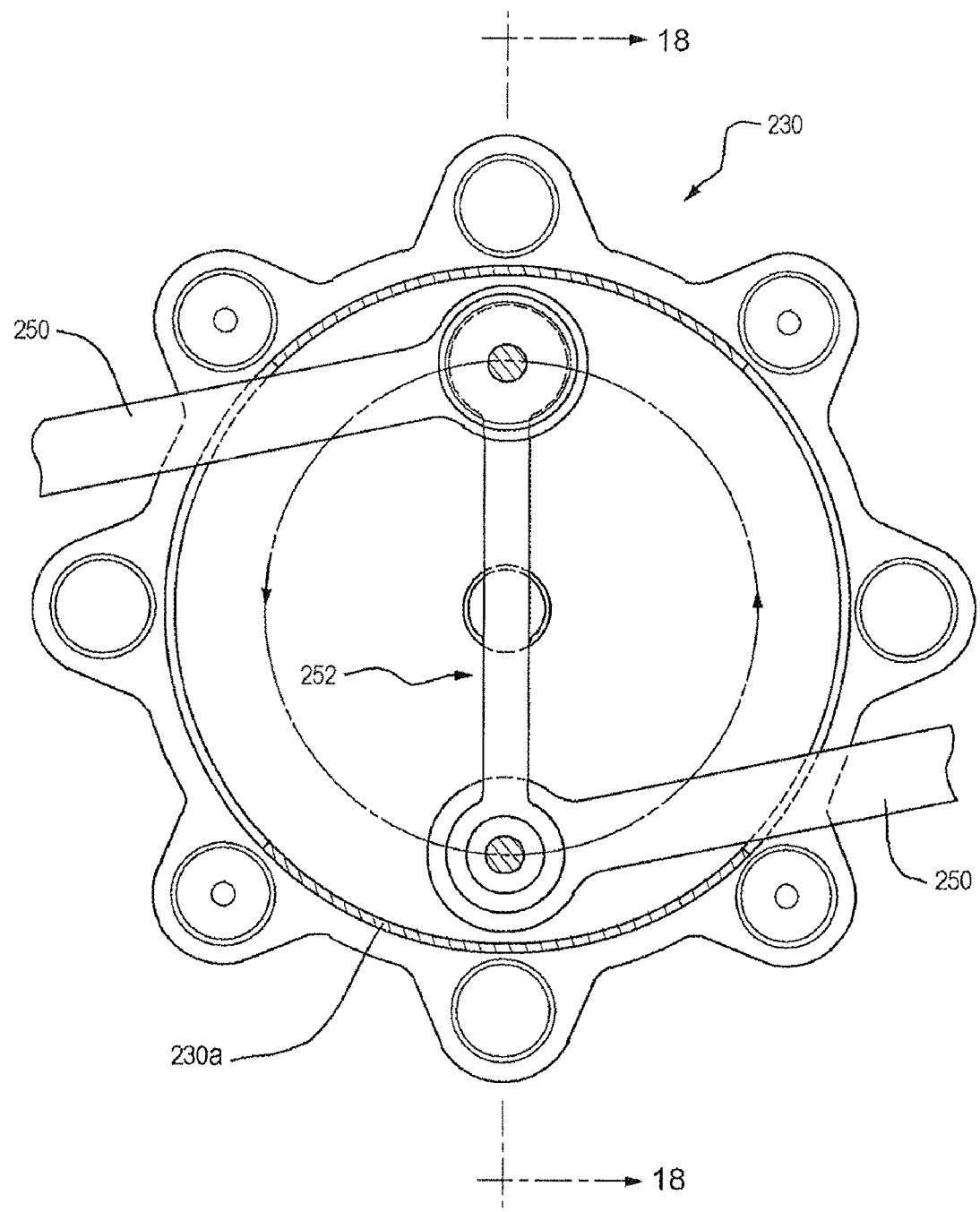
FIG. 17 is a sectional view taken along line 17-17 of FIG. 15.
Figure 18:
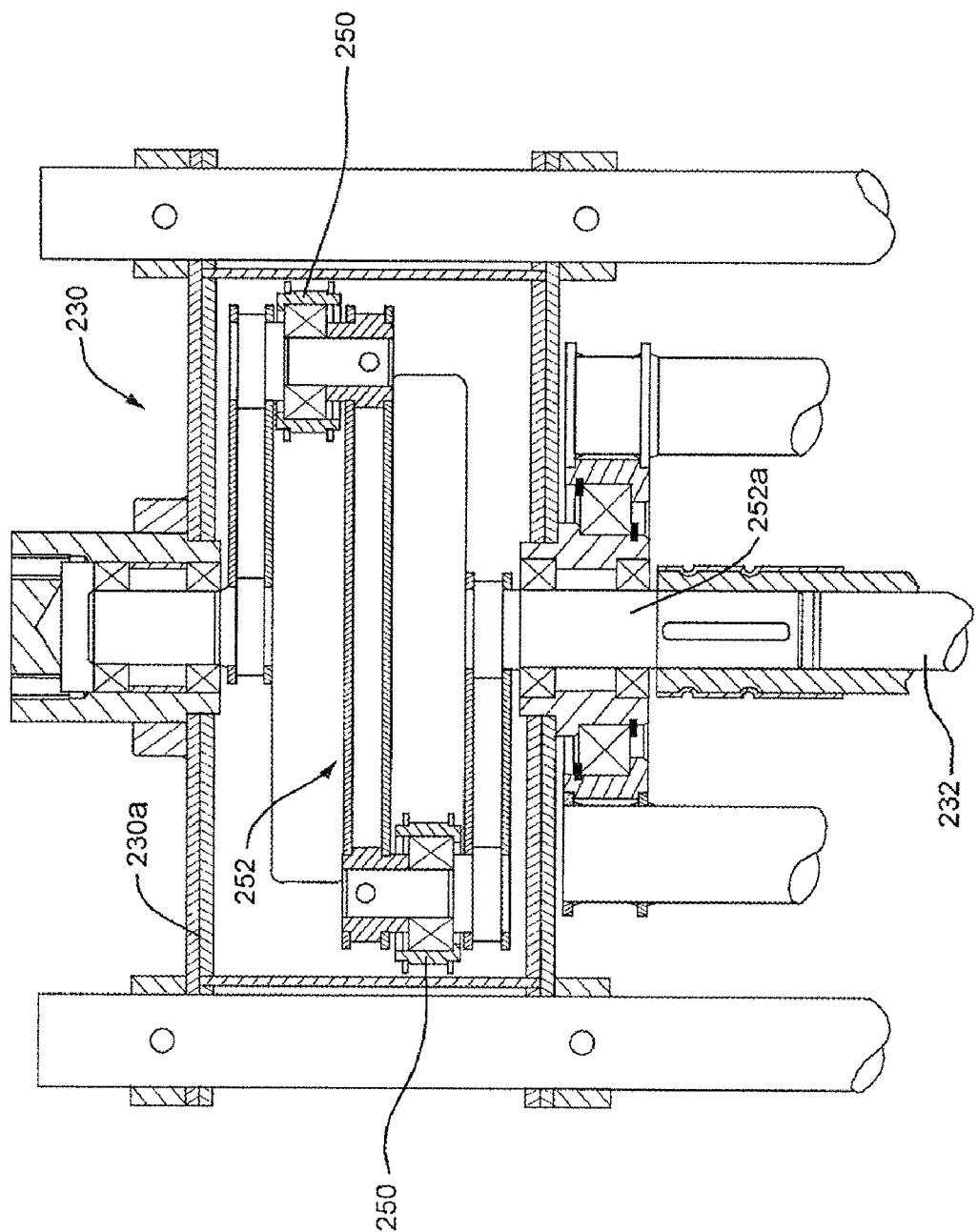
FIG. 18 is a sectional view taken along line 18-18 of FIG. 17.

As best seen in FIGS. 17 and 18, the end of each link 250 inside crank case assembly 230 is pivotally connected to the opposite lobes of a crank shaft 252 mounted inside assembly housing 230a for rotation about a vertical axis. The lower end 252a of the crank shaft is coupled to the upper end of the drive shaft 232 that extends down through tower 210. Thus, the oscillatory motion of blades 224 is converted by crank shaft assembly 230 to unidirectional motion of the shaft 232 which drives generator 236 (FIG. 14B). The crank case assembly 230 design may also be used in the other described embodiments of my apparatus.

Although not shown in the drawing figures, the crank shaft assembly 230 may also include inertial devices similar to the flywheels 176 in FIGS. 9 and 10. These are coupled mechanically to the crank shaft 252 to obtain the same desired effects described above for the apparatus embodiments that rely on hydropower.

As is apparent from FIG. 16, since housing 220 always faces into the wind just as does an airplane wing, the direction of the wind or the angle of the apparent wind on oscillating blades 224 never changes even with very high wind gusts. The entire housing 220 with the oscillating blades 224 pivots into the wind about the crank shaft 252 axis, which is also the centerline of tower 202 and driveshaft 232. This allows the IMAG 236 (FIG. 14B) to be stationary in space avoiding the complication of twisting electric power leads to the ground or the necessity of slip rings. Also, the housing itself is shaped so that the air flows around the sides of the housing and through the housing so that no high pressure region exists behind apparatus 200. In addition, the blades 224 co-act with the housing side walls 243c, 243d so that the outward sides of the blades block air flow through the housing at blade angles of 180° to 230° (BDC). Likewise, when the blades are at blade angles of 0° to 50° (TDC), the inward sides of the blades (and bracket 226a) block air flow through the central region of the housing. Thus, when the blades are near their TDC and BDC positions, they experience the same fluid flow regimes and forces described above for the invention embodiments that rely on hydropower, vis a vis cyclically blocking the free stream flow.

Figure 19:
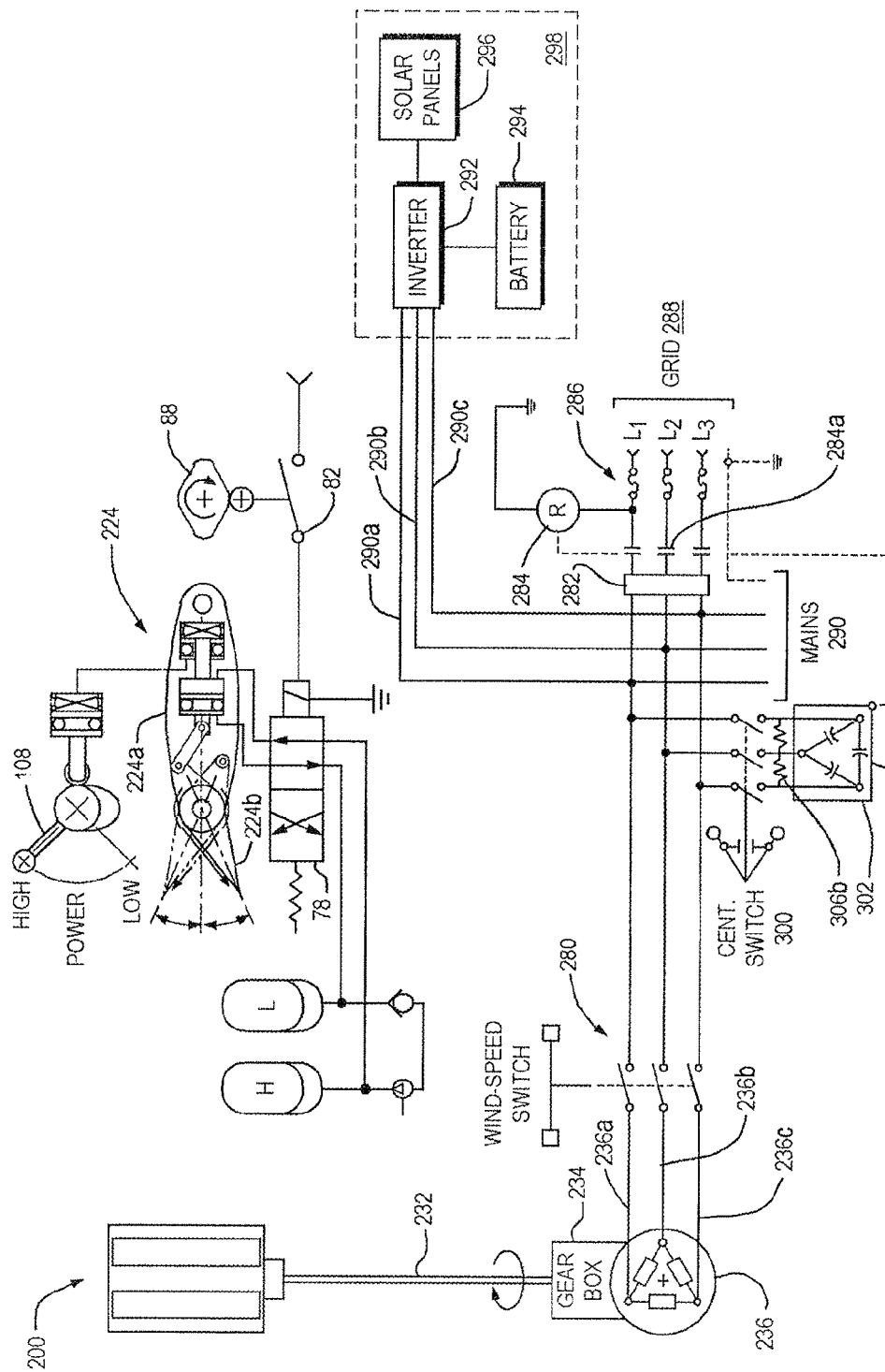
FIG. 19 is a schematic diagram showing the typical control system for the FIGS. 14A and 14B apparatus, which system may also be used in the other embodiments described herein.

Referring now to FIG. 19, preferably IMAG 236 has a three phase output appearing on wires 236a, 236b and 236c. These wires are connected by way of a wind speed switch 280 to a meter 282, and thence though the contacts 284a of a safety relay 284, and a fuse bank 286, all in series, to a public utility grid indicated at 288. Those same wires may also be connected to a house mains indicated at 290.

To provide standby or start up power to the apparatus, the wires 236a-236c are also connected through wires 290a-290c to the output of an inverter 292 which may receive power from a battery pack 294 and/or a solar panel bank 296. The inverter, which also has circuitry for a battery charge controller, the battery pack and solar panel bank may all be contained in a single power module 298.

Still referring to FIG. 19, the three wires 236a-236c following switch 280 are also connected by way of a centrifugal switch indicated at 300 to a reactive power conditioner 302 consisting of three capacitors 302a connected in a delta configuration with a pair of resistors 302b connected in series between the capacitors.

When the blades 224 in apparatus 200 are exposed to a wind speed less than 4 meters per second (mps), apparatus 200 is stopped. However, at that speed, the switch 280 which senses wind speed closes, and the IMAG 236 functions as a motor and motors up to synchronous speed, shown in FIG. 19A, using either power from the grid 288 or the power module 298. At synchronous speed, the centrifugal switch 300, which rotates with the generator 236 rotor, closes and connects the power conditioner 302 to wires 236a-236c so that the apparatus begins to deliver power to the grid 288 and mains 290. The manual power control 108 can be used as described above in connection with FIG. 5 to control the speed and/or to match the power generated by the apparatus to the load by feathering the blade flaps 224b.

Figure 19A:
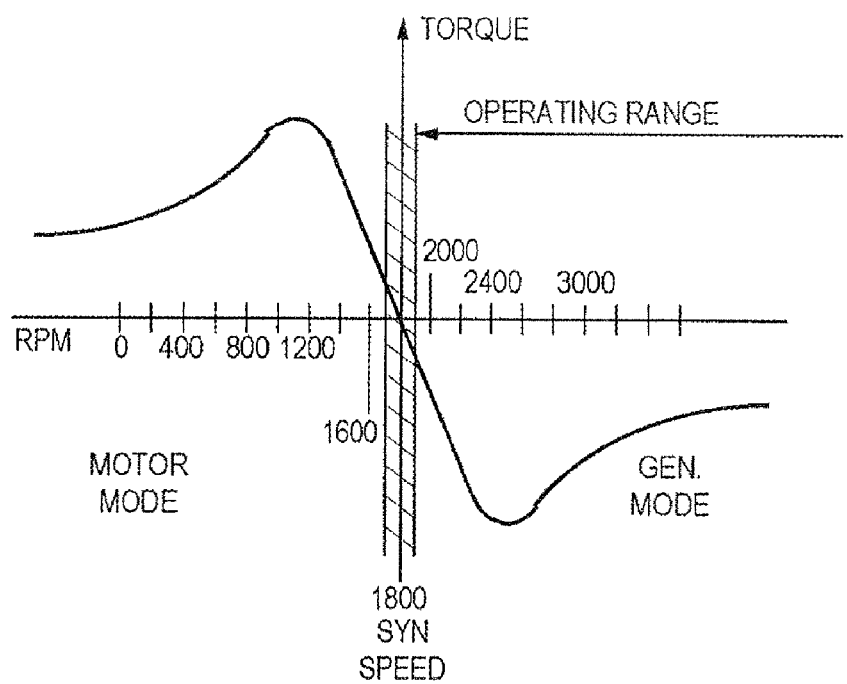
FIGS. 19A and 19B are graphical diagrams illustrating the operation of the FIG. 19 control system.
Figure 19B:
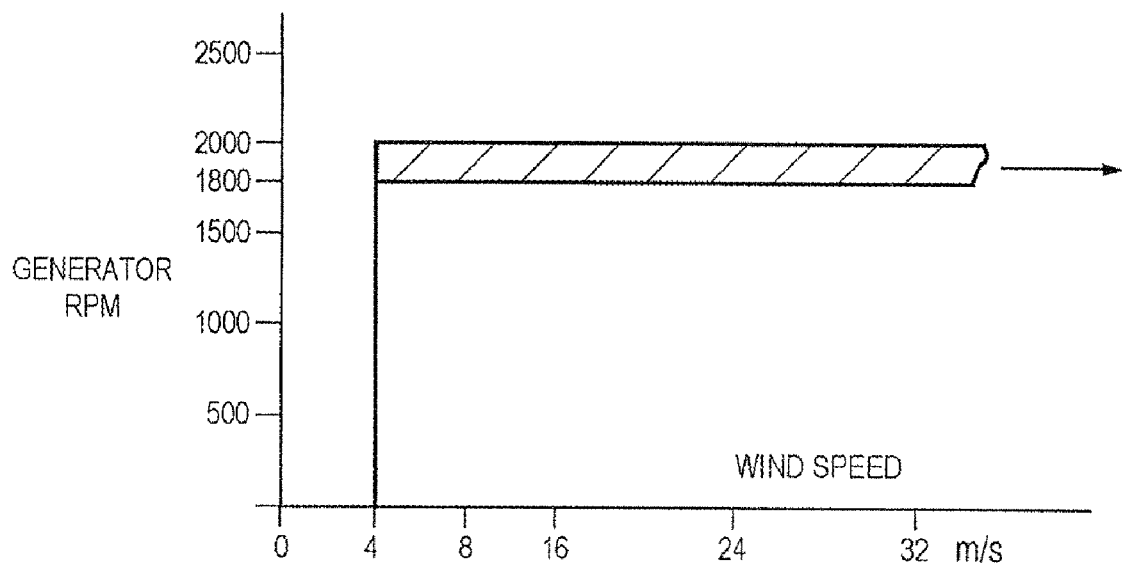

As indicated in FIGS. 19A and 19B, above a wind speed of 4 mps, the apparatus always operates within its desired speed range, i.e. 1800 to around 1900 rpm shaft speed. Thus, it never needs to be shut off due to overly high winds because it always faces into the wind and progressively feathers its flaps 224b to stay within that range. As shown in FIG. 19B, the generator output speed, voltage and frequency remain essentially the same over a very wide range of wind speeds and electrical loads whether the machine is operated off the grid or in conjunction with it.

Apparatus similar to apparatus 200 may also be totally immersed in flowing liquid, e.g. water in hydropower applications. In this case, the apparatus housing should have stronger tubes, straps and ribs and a metal skin. Also, such apparatus should preferably be turned upside down and suspended from a barge anchored in the middle of a moving body of water, e.g. the Hudson river or the Gulf Stream. Preferably, the IMAG 236 in such hydro applications should be located above water.

4. Magnus Roller Embodiments

As noted in the summary of the invention section of the application, a geometrically symmetrical blade or vane may be rendered non-symmetrical by means other than an articulating flap. FIG. 20, which is similar to FIG. 16 and employs some of the same identifying numerals, shows a wind power apparatus comprising a housing 220' containing a pair of blades 350 pivotally mounted relative to the housing via shafts 246 and connected by links 250 to a crank case assembly 252 which may be similar to assembly 230 and which drives an IMAG similar to an IMAG 236 described above. FIGS. 20A and 20B show the housing 220' in greater detail.

Figure 22:
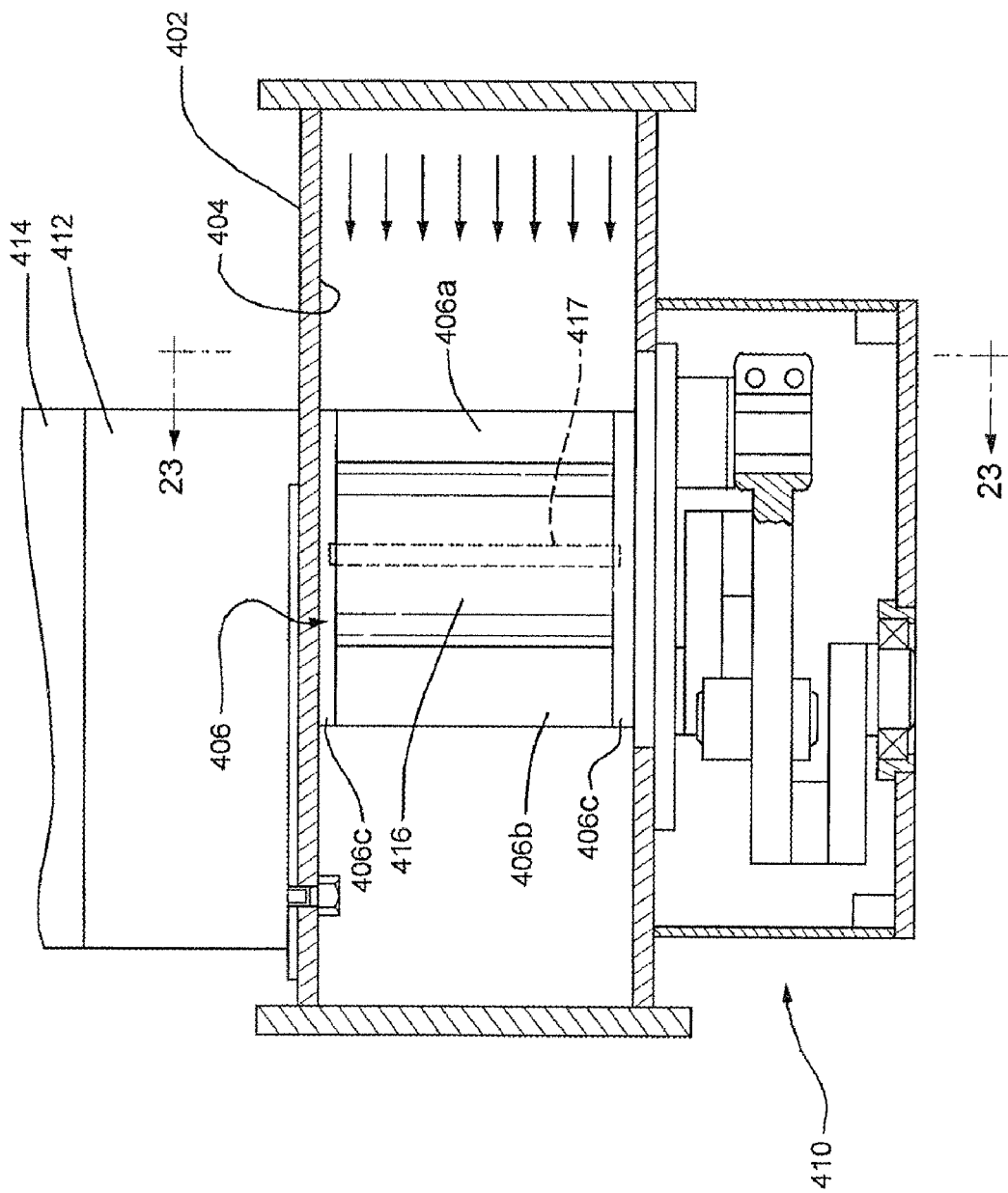
FIG. 22 is a view similar to FIG. 8 showing a hydro-powered version of my invention whose blades incorporate Magnus rollers.

The blade 350 includes a main body 354 having a leading edge segment 354a and a trailing edge segment 354b and which contains an embedded Magnus roller 356 between those segments that is rotatably mounted within the main body 354 by a shaft 358 whose opposite ends are journalled in relatively thick upper and lower end cap ribs of blade 350; see ribs 406c and shaft 417 in FIG. 22. Those end cap ribs are, in turn, pivotably mounted to housing upper and lower walls 243a, 243b via shaft(s) 246. Roller 356 extends almost the entire length of main body 354 and its diameter is much larger than the width of the main body so that it extends out appreciably on opposite sides of the main body. In the illustrated apparatus, each shaft 358 also coincidentally, but not necessarily, constitutes the pivotal connection between the blade 350 and its associated link 250.

As shown in FIG. 20, each shaft 358 carries at least one pinion 360 which meshes with an arcuate, speed increasing stationary rack or gear segment 362 centered on the corresponding shaft 246 and mounted to the housing top and/or bottom wall 243a, 243b, which rack is more or less parallel to links 250 when blades 350 are in their TDC or BDC positions. Thus, when the two blades are moving toward their TDC positions looking down in the figure, the left hand roller 356 is rotated counterclockwise while the right hand roller is rotated clockwise. The reverse is the case when the two blades are swinging toward their BDC positions. Thus the self-energized Magnus rollers 356 render the otherwise geometrically symmetrical blades cyclically aerodynamically non-symmetrical. This is because on the side of each blade 350 where the Magnus roller is moving in the direction of the wind, more lift is created than at the opposite side of that blade where the surface of the roller is moving opposite to the wind.

Thus for example, as the right hand blade 350 in FIG. 20 swings toward the left, its roller 356 is rotated clockwise creating more lift at the left hand side of that blade, thus accelerating the leftward swing of that blade. That blade continues to swing to its TDC position, propelled by the rotational inertia and lift forces of the Magnus roller while the rotational inertia of the IMAG 236, the crank 252 as well as other rotational components of the system cause blade 350 to complete its half cycle moving into and through TDC and then to reverse direction and swing toward its BDC position in FIG. 20. At TDC, the tip of blade 350 is made to interact with its nearby boundary, cyclically shutting off the incoming flow, similar to the effect produced by those machines having flaps, but just not as pronounced. That, of course, results in roller 356 being rotated in the opposite direction creating lift at the outboard side of the blade thereby accelerating the blade toward its BDC position where it goes through an identical reversal process.

The blades 350 coact with housing 220' as described above in connection with FIGS. 15 and 16 to minimize drag and to extract the maximum amount of energy from the winds.

Figure 20C:
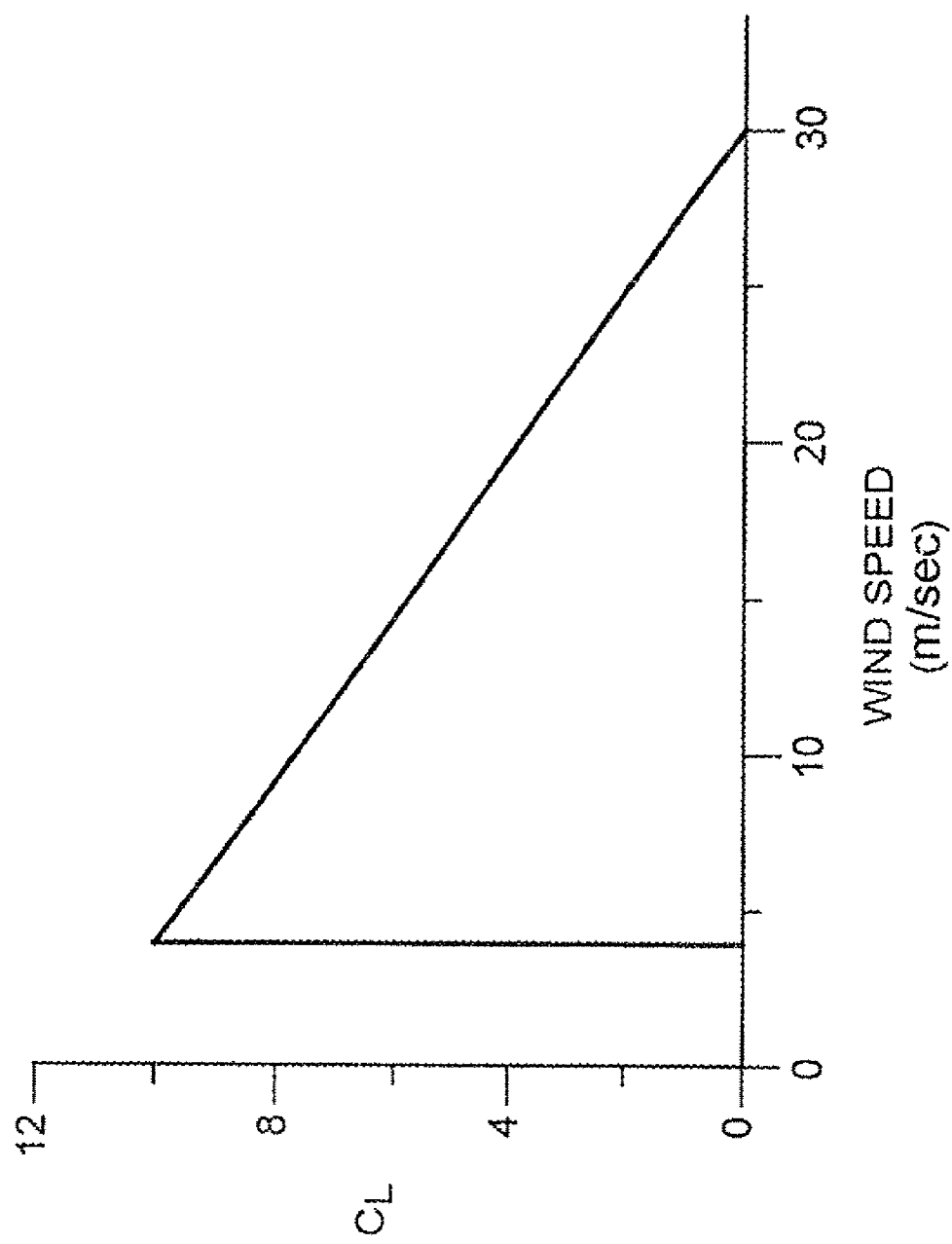
FIG. 20C is a graph illustrating the relationship between wind speed and blade Coefficient of Lift that can be produced by apparatus using Magnus rollers, such as the FIG. 20 apparatus.

The efficiency of the apparatus is maximized by the incorporation of a Magnus roller in each blade. Indeed, I have found that, as shown in FIG. 20C, there is a direct relationship between the ratio of the surface speed, $S_R$, of the Magnus roller 356 to the free stream velocity, $S_W$, of the wind, less a fraction of about one half. Since with my apparatus, the blade cycle speed remains constant within a narrow range, this means that the coefficient of lift, $C_L$, is inversely proportional to the free stream wind velocity $S_W$ and the aforesaid ratio $S_R/S_W$ is highest at the startup wind speed of about 4 m/s and decreases with increasing wind speed, as shown in FIG. 20C. Actually, I have found that $S_R/S_W$ must be greater than about one half in order for it to generate a positive "Magnus Effect lift" force, and that the coefficient of lift, $C_L$, due to this force is proportional to $2\pi$ $(S_R/S_W-0.5)$, whereas the "$C_L$ for a conventional aerofoil is $2\pi$ times the sine of the angle that the apparent wind or water makes with the blade's chord which is usually not more than about 12°, i.e. a sine value of 0.21. This means that while the $C_L$ of a conventional aerofoil without flaps tops out at about 1.3, the Magnus roller-equipped aerofoil can have a $C_L$ of ten times that amount.

The force produced in both cases is proportional to the pertinent coefficient of lift, $C_L$, times the square of the free wind/water speed, $S_W$. Since that speed is, of course, the same for all sizes of wind or water machines, the above ratio dictates that larger machines have an easier time of meeting the required ratio, or conversely that smaller machines have to cycle faster in order to achieve the required ratio in order for the machine to generate the forces enabling it to work. Also, larger machines for wind will pre-form better than smaller machines because they operate in a more favorable Reynolds'

Number regime and are less subject to flow separation effects. In any case, a speed-increasing gear mechanism is usually required.

In addition, the pure Magnus roller machine versions in particular, i.e. without flaps, generally have to be motored up to synchronous speed in order to successfully start them. Should any of my machines stall or slow down below synchronous speed in midcycle for any reason other than low wind speeds, the IMAG automatically becomes a motor and powers it back up to synchronous speed where the wind, if present, takes over.

Since the Magnus rollers start out at zero angular velocity at their TDC and BDC positions during each half cycle, there is always a portion of the cycle where this force is zero or slightly negative, but fortunately this can be arranged, by careful attention to gear ratio and roller diameter design details, to be during that part of the cycle when the blade output torque is getting its maximum boost from the powerful Wind/Water Hammer effect, which is also the portion of the cycle when the drag force itself is making its maximum positive output torque contribution.

Referring again to FIG. 13B, since the Magnus rollers, at the beginning of each half cycle at TDC and BDC, start out at zero speed as they reverse direction, their surface speed is also zero, as shown by the leftmost vertical scale in that figure. When, for example, the roller's surface speed is between zero and +/−2 meters per second (m/s), shown by the horizontal dashed lines above and below the zero axis, or about one half the free wind's start up speed of 4 m/s, the Magnus roller's lift force will be very small or even slightly negative. However, this is perfectly acceptable, for if the roller's rack and pinion gear ratios are chosen correctly, this occurs during the part of the cycle, shown by the vertical lines in FIG. 13B, where the horizontal dashed lines cross the sinusoidual velocity curve. This moment in the cycle is when the blade is being propelled by the much larger Wind/Water Hammer force and where the drag force itself makes its maximum positive contribution to the output torque. In any case, because of the unfavorable geometries at that moment in the cycle between the connecting link 250 and the crank 252 (FIG. 20), these forces cannot be transmitted to the IMAG at that instant.

Figure 13B:
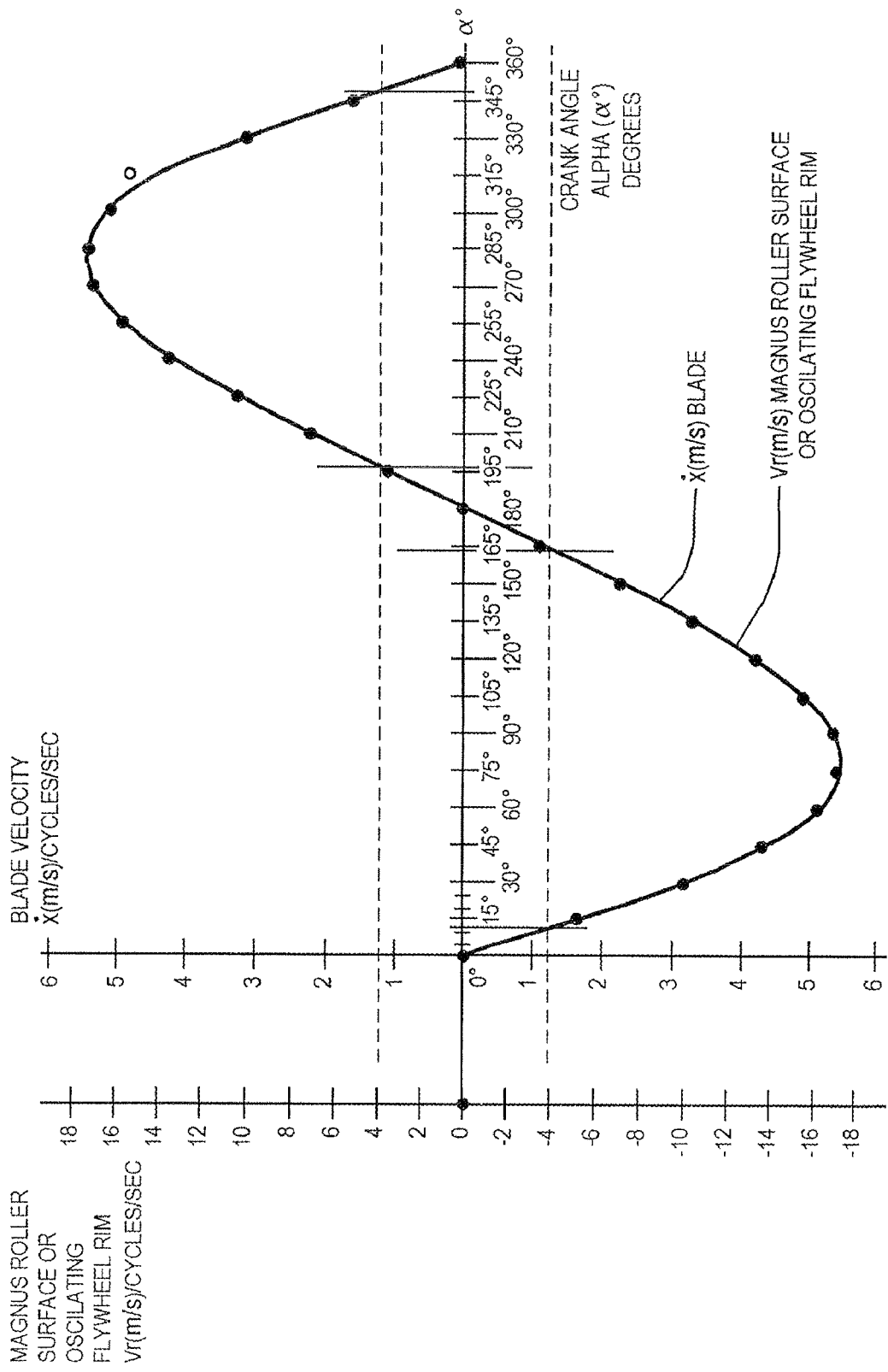

As can be seen in FIG. 13B, the surface speed, $S_R$, of the Magnus roller increases to about 4.5 times that of the start up wind speed as the roller nears midcycle, making its theoretical coefficient of lift, $C_L$, at that instant about 25. Also, this is at the exact place in the blade cycle where the most favorable geometries for torque transmission exist. The magnitude of the force produced by this Magnus effect is proportional to the ratio $S_R/S_W$ times the square of the wind free speed, $S_W$, creating lift forces an order of magnitude higher than those produced by conventional blades, even with flaps, and especially at low wind speeds.

To enjoy the full possible benefits of the Venturi forces, however, the machines, with or without Magnus rollers, should also be equipped with flaps, as will be described shortly, in order to enjoy the crisper, more decisive, more powerful interaction forces at the boundaries. One unique feature of machines equipped with Magnus rollers is that, unlike the situation with conventional windmills, wind gusts are generally nonevents as the $C_L$ decreases with increasing wind speed. Further, if one carefully chooses the gearbox and roller gear ratios such that this wind speed ratio equals one half at some desirable maximum wind operating speed, say 30 m/s, making each Magnus roller 356 surface speed 15 m/s, this machine will automatically shut down at this desirable maximum operating speed of 30 m/s as its $C_L$ has gone to zero, as shown in FIG. 20C.

Of course, the other blade 350 in FIG. 20 functions in the same way, out of phase with the first-mentioned blade; two out of phase blades are desired for mechanical balance just as nature does with its designs that fly through the atmosphere. This machine would act identically if a wall were placed between the blades in line with the vane 226, making it look more like the embodiment in FIGS. 6-13, but it is redundant. Otherwise that apparatus operates in more or less the same way and under similar controls as the apparatus 200 in FIG. 19, less the valve 78 and associated hydraulic circuit. A machine with this configuration would most likely be selected for smaller applications where it is desirable to minimize capital costs and for those those locations having infrequent or no maintenance available.

Figure 21:
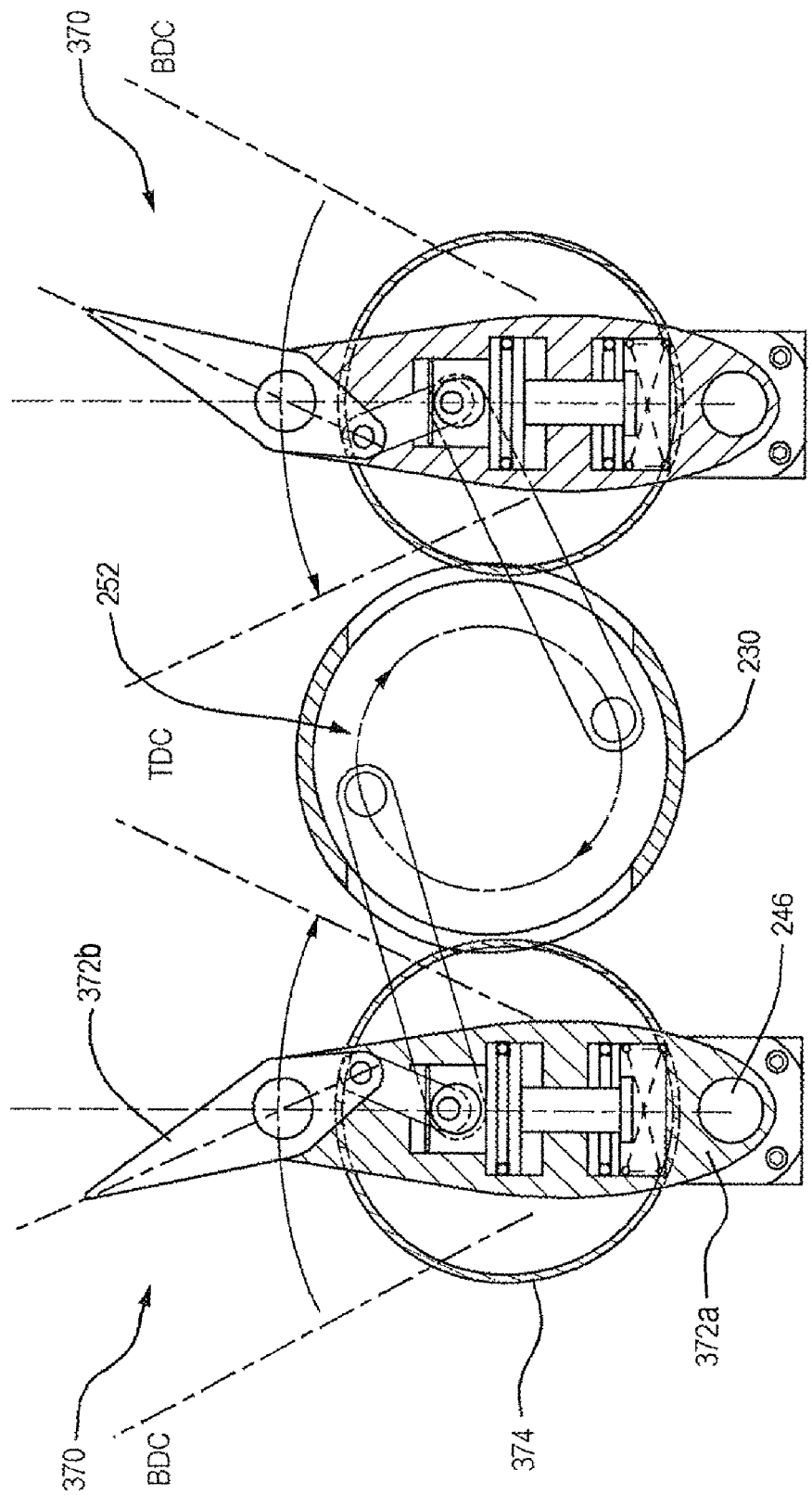
FIG. 21 is a view similar to FIG. 20 of an embodiment whose blades incorporate both flaps and Magnus rollers.

FIG. 21 shows another apparatus embodiment which is a combination of the embodiments illustrated in FIGS. 16 and 20. In other words, each oscillating blade 370 is articulated in that it includes a main body 372a and a pivoting flap 272b which operates in the same way as described above in connection with FIG. 16. Moreover, each blade 370 also includes an imbedded Magnus roller 374 in body 372a which is rotated in correlation with the swinging motion of the blades to increase the blade lift at the side of the blade facing the corresponding TDC or BDC position toward which the blade is moving at any given time. This hybrid apparatus obtains the advantages of both FIGS. 16 and 21 apparatus embodiments and is most efficient and flexible over a wide operating range of wind speeds and electrical load requirements.

Figure 23:
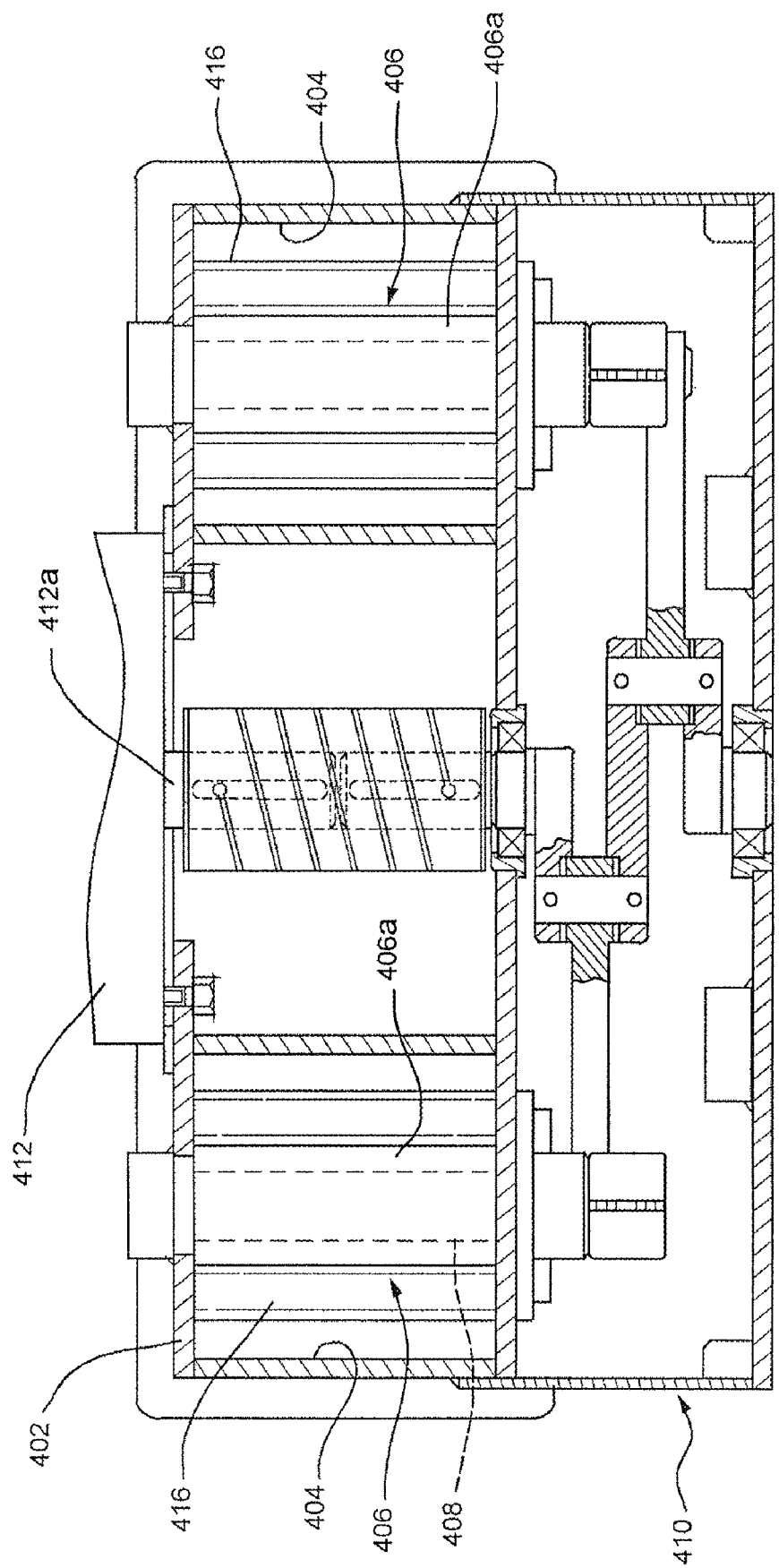
FIG. 23 is a sectional view taken along line 23-23, of FIG. 22.

Of course blades with Magnus rollers like those in FIGS. 20 and 21 can also be used in the hydro-powered versions of my apparatus. For example, FIGS. 22 and 23 illustrate a dual channel apparatus similar to the one depicted in FIGS. 7 and 8 comprising a housing 402 defining two channels or passages 404. A blade indicated generally at 406 is pivotally mounted in each channel or passage 404 by way of a shaft 408 journalled in the upper and lower walls of housing 402. As with the other embodiments, each shaft 408 is connected to a crank shaft assembly shown generally at 410 which rotates the shaft 412a of a gear reducer 412 which, in turn, drives an IMAG 414.

As shown in these figures, each blade 406 has a leading edge 406a at shaft 408 and a trailing edge 406b which, in the illustrated embodiment, is fixed. However, it could just as well articulate in the same manner as the flaps of the blades in the FIG. 21 apparatus embodiment. In either event, each blade 406 includes a Magnus roller 416 imbedded between the blade leading and trailing edges. The roller is rotatably mounted via a shaft(s) 417 journalled in the upper and lower end cap ribs 406c of blade 406. Each roller may be rotated in one direction or the other as described above in connection with FIG. 20. The two blades 406 oscillate 180° out of phase in their respective passages with the Magnus rollers contributing blade "lift" as described above, aided by the aforesaid boundary interactions at TDC and BDC.

In this embodiment the flywheels described above in connection with the FIG. 8 hydro-powered apparatus may not be required because the mass of the rotating Magnus rollers can sometimes provide the necessary inertia to store the intracycle energies generated near the TDC and BDC positions.

It will thus be seen that the object set forth above, among those made apparent from preceding description, are efficiently attained. Also, certain changes may be made in carrying out the above method steps and in the above constructions without departing from the scope of the invention. For example, with obvious modifications, the various components and subsystems in the various embodiments may be substituted for comparable components or subsystems in other embodiments to best suit the particular application. Therefore, it is intended that all matter contained in the above description are showed in the accompanying drawings shall be interpreted as illustrative and not in a limiting sense.

The invention claimed is:

1. Power generation apparatus comprising
a wing-shaped blade having opposite sides, opposite ends and leading and trailing edges extending between said ends;
a blade shaft extending along an axis in the blade that is in close parallel relation to the leading edge of the blade and fixed to move with the blade;
supports for supporting the blade shaft so that when the blade is positioned in a moving fluid stream with said leading edge facing upstream the blade can oscillate about said axis between first and second extreme positions on opposite sides of a neutral position;
lift differential producing means in the blade for producing a lift differential at the opposite sides of the blade in the presence of the moving fluid stream;
means for switching the lift differential producing means so that one blade side or the other produces the greater lift in the presence of the moving fluid stream;
coordinating means for coordinating the switching means with the swinging of the blade so that the switching occurs only at each extreme position of the blade to produce a blade lift which urges the blade toward the other extreme position so that the blade oscillates between said extreme positions in the presence of the moving fluid stream;
first and second fluid boundaries located adjacent to the respective first and second extreme positions of the blade close to trailing edge of the blade when the blade is in said first and second extreme positions for simultaneously causing a substantial blocking of the flow of the moving fluid stream on the blade side facing each extreme position and a rapid increase in said flow on the opposite blade side when the blade reaches each extreme position to impel the blade toward the other extreme position, and
a power takeoff device which reciprocates in response to the oscillation of the blade so that the apparatus can drive an external machine.

2. The apparatus defined in claim 1, wherein
the lift differential producing means include a Magnus roller rotatably mounted in the blade parallel to said axis between said leading and trailing edges, said roller projecting from opposite sides of the blade, and
the coordinating means include means coupled to the blade for rotating said roller in correspondence with the swinging motion of the blade so that the roller reverses its rotation at said extreme positions of the blade.

3. The apparatus defined in claim 1, wherein
the lift differential producing means include means for changing the shape of the blade so that one side produces more lift than the other, and
the coordinating means include control means for controlling the shape changing means to reverse the blade shape at said extreme positions of the blade.

4. The apparatus defined in claim 3, wherein
the shape changing means include a flap pivotally mounted to the blade and forming the trailing edge thereof, said flap being swingable between a first position wherein it extends out from one side of the blade and a second position when it extends out from the other side of the blade, and
the coordinating means include a control device for swinging the flap between its said two positions when said blade is at said first and second extreme positions.

5. The apparatus defined in claim 1, wherein said power takeoff device is connected to a motion converter having an output shaft that is rotated unidirectionally in response to the oscillation of said blade.

6. The apparatus defined in claim 5, wherein the motion converter includes a crank.

7. The apparatus defined in claim 6, and further including a flywheel coupled to said blade shaft for oscillatory motion therewith.

8. The apparatus defined in claim 7, wherein said external machine is an electric generator having an armature connected to said output shaft.

9. The apparatus defined in claim 1, wherein said supports are positioned on opposite sides of a water stream so that said axis extends substantially horizontally in said water stream with said boundaries being located above and below said axis.

10. The apparatus defined in claim 1, wherein said supports are positioned in opposite walls of a water conduit so that said axis bridges the conduit, said boundaries being conduit structure offset on opposite sides of said axis.

11. The apparatus defined in claim 1 wherein said axis is fixed in space.

12. Power generation apparatus comprising
a wing-shaped blade having opposite sides, opposite ends and leading and trailing edges extending between said ends;
a blade shaft extending along an axis in the blade that is in close parallel relation to the leading edge of the blade and fixed to move with the blade;
supports for supporting the blade shaft so that when the blade is positioned in a moving fluid stream with said leading edge facing upstream the blade can oscillate about said axis between first and second extreme positions on opposite sides of a neutral position;
lift differential producing means in the blade for producing a lift differential at the opposite sides of the blade in the presence of the moving fluid stream;
means for switching the lift differential producing means so that one blade side or the other produces the greater lift in the presence of the moving fluid stream;
coordinating means for coordinating the switching means with the swinging of the blade so that the switching occurs only at each extreme position of the blade to produce a blade lift which urges the blade toward the other extreme position so that the blade oscillates between said extreme positions in the presence of the moving fluid stream;
a power takeoff device which reciprocates in response to the oscillation of the blade so that the apparatus can drive an external machine;
first and second fluid boundaries located close to said first and second extreme positions of the blade and extending at an acute angle to the trailing edge of the blade when the blade is in said first and second extreme positions, said supports being positioned on opposite sides of a water stream so that said axis extends substantially horizontally in said water stream with said boundaries being located above and below said axis;
an inflatable dam extending between said sides of the stream downstream from the blade, and
means for selectively inflating and deflating the dam.

13. Power generation apparatus comprising
a wing-shaped blade having opposite sides, opposite ends and leading and trailing edges extending between said ends;
a blade shaft extending along an axis in the blade that is in close parallel relation to the leading edge of the blade and fixed to move with the blade;
supports for supporting the blade shaft so that when the blade is positioned in a moving fluid stream with said leading edge facing upstream the blade can oscillate about said axis between first and second extreme positions on opposite sides of a neutral position;
lift differential producing means in the blade for producing a lift differential at the opposite sides of the blade in the presence of the moving fluid stream;
means for switching the lift differential producing means so that one blade side or the other produces the greater lift in the presence of the moving fluid stream;
coordinating means for coordinating the switching means with the swinging of the blade so that the switching occurs only at each extreme position of the blade to produce a blade lift which urges the blade toward the other extreme position so that the blade oscillates between said extreme positions in the presence of the moving fluid stream;
a power takeoff device which reciprocates in response to the oscillation of the blade so that the apparatus can drive an external machine; and
wherein the lift differential producing means include holes in the sides of the blade and an air pressure source that can increase or decrease the air pressure at the holes in one side of the blade as compared to the air pressure at the holes in the other side of the blade and the coordinating means include fluid control means for reversing said air pressures.

14. Power generation apparatus comprising
a wing-shaped blade having opposite sides, opposite ends and leading and trailing edges extending between said ends;
a blade shaft extending along an axis in the blade that is in close parallel relation to the leading edge of the blade and fixed to move with the blade;
supports for supporting the blade shaft so that when the blade is positioned in a moving fluid stream with said leading edge facing upstream the blade can oscillate about said axis between first and second extreme positions on opposite sides of a neutral position;
lift differential producing means in the blade for producing a lift differential at the opposite sides of the blade in the presence of the moving fluid stream;
means for switching the lift differential producing means so that one blade side or the other produces the greater lift in the presence of the moving fluid stream;
coordinating means for coordinating the switching means with the swinging of the blade so that the switching occurs only at each extreme position of the blade to produce a blade lift which urges the blade toward the other extreme position so that the blade oscillates between said extreme positions in the presence of the moving fluid stream;
a power takeoff device which reciprocates in response to the oscillation of the blade so that the apparatus can drive an external machine;
first and second fluid boundaries located close to said first and second extreme positions of the blade and extending at an acute angle to the trailing edge of the blade when the blade is in said first and second extreme positions, wherein said supports are located in a housing so that said axis extends substantially vertically in the housing, said boundaries being housing structure laterally offset on opposite sides of said axis, and
further including a tower having a base, a base support and a top, and securing means for securing the housing at the top of the tower.

15. The apparatus defined in claim 14, wherein the tower includes structure enabling the raising and lowering of the housing relative to the base support.

16. The apparatus defined in claim 15, wherein the tower includes
a pivot pivotally connecting the base to the base support enabling the tower to be swung between a vertical position and a horizontal position, and
a lock for releasably locking the tower in said vertical position.

17. The apparatus defined in claim 15, wherein the securing means include an elevator device in the tower enabling the housing to be moved between the top of the tower and said base.

18. The apparatus defined in claim 14, wherein
said securing means include a pivot enabling the housing to pivot on the tower, and
the housing includes a wind vane that catches any available wind so as to pivot the housing until the leading edge of the blade faces into the wind.

19. Power generation apparatus comprising
a wing-shaped blade having opposite sides, opposite ends and leading and trailing edges extending between said ends;
a blade shaft extending along an axis in the blade that is in close parallel relation to the leading edge of the blade and fixed to move with the blade;
supports for supporting the blade shaft so that when the blade is positioned in a moving fluid stream with said leading edge facing upstream the blade can oscillate about said axis between first and second extreme positions on opposite sides of a neutral position;
lift differential producing means in the blade for producing a lift differential at the opposite sides of the blade in the presence of the moving fluid stream;
means for switching the lift differential producing means so that one blade side or the other produces the greater lift in the presence of the moving fluid stream;
coordinating means for coordinating the switching means with the swinging of the blade so that the switching occurs only at each extreme position of the blade to produce a blade lift which urges the blade toward the other extreme position so that the blade oscillates between said extreme positions in the presence of the moving fluid stream;
a power takeoff device which reciprocates in response to the oscillation of the blade so that the apparatus can drive an external machine;
a second power generation apparatus similar to said first-mentioned apparatus, and
coupling means coupling together the two power takeoff devices of said first-mentioned and said second power generation apparatus so that said two power takeoff devices reciprocate 180° out of phase.

20. The apparatus defined in claim 19 wherein said coupling means includes a dual lobe crank having an output shaft which is rotated unidirectionally in response to the oscillatory motions of said two blades.

21. The apparatus defined in claim 20 and further including an electric generator having an armature coupled to said output shaft.

22. The apparatus defined in claim 19 and further including first and second inertial devices;
   first moving means for moving the first inertial device in coordination with the swinging motion of said blade, and
   second moving means for moving the second inertial device in coordination with the swinging motion of the blade of said second power generation apparatus.

23. The apparatus defined claim 22, wherein
   the first and second inertial devices are flywheels, and
   the first and second moving means each include a pinion fixed to rotate with the corresponding flywheel, and a gear fixed to move with the corresponding blade and in mesh with the corresponding pinion.

24. A method for generating power comprising the steps of
   forming a wing-shaped blade having opposite sides, opposite ends, leading and trailing edges extending between said ends and a shaft fixed to the blade and extending parallel to said leading edge;
   rotatably supporting the shaft so that the blade is exposed to a moving fluid stream with said leading edge facing upstream and can oscillate about an axis between first and second extreme angular positions on opposite sides of a neutral position;
   changing the aerodynamic characteristics of the blade in coordination with the swinging motion of the blade so that just after the blade swings to said first extreme position, the blade side facing away from the first extreme position produces more lift than the blade side facing said first extreme position, and just after the blade swings to said second extreme position, the blade side facing away from the second extreme position produces more lift than the blade side facing the second extreme position, so that the blade oscillates between said extreme positions in the presence of the moving fluid stream;
   causing a substantial blocking of the flow of the moving fluid stream on the blade side facing each extreme position and a rapid increase in said flow on the opposite blade side when the blade reaches each extreme position to impel the blade toward the other extreme position, and
   providing a power takeoff device which reciprocates in response to the oscillation of the blade to drive an external machine.

25. The method defined in claim 24 and including the step of coupling a motion converter between the power takeoff device and the armature of an electric generator so that the oscillatory motion of the blade rotates the armature causing the generator to produce electric power.

26. The method defined in claim 24 wherein said axis is fixed in space.

27. The method defined in claim 24 wherein the changing step is accomplished by
   providing a flap at the trailing edge of the blade which is angularly deflectable between two extreme deflection positions on said opposite sides of the blade, and
   switching the flap between said two deflection positions just after the blade reaches said first and second extreme positions.

28. The method defined in claim 27 and further including the step of controlling the reciprocation speed and/or power of the power take off device by changing the angle between said two extreme deflection positions.

29. The method defined in claim 24 wherein the changing step is accomplished by
   providing a cylindrical Magnus roller in the blade which is rotatable in opposite directions about a roller axis extending parallel to said pivot axis and whose cylindrical surface protrudes from the opposite sides of the blade, and
   coordinating the rotation of the roller to the swinging motion of the blade so that the roller reverses its rotation just after the blade reaches said extreme positions of the blade.

30. Power generation apparatus comprising
   a wing-shaped blade having opposite sides, opposite ends and leading and trailing edges extending between said ends;
   supports for supporting the blade in a moving fluid stream with its leading edge facing upstream so that the blade can oscillate about an axis extending along the blade between first and second extreme positions on opposite sides of a neutral position;
   an aerodynamic device in the blade for producing a lift differential at the opposite sides of the blade in the presence of the moving fluid stream, said device being reversible so that one blade side or the other produces the greater lift;
   a mechanism for coordinating the device to the swinging motion of the blade so that just after the blade swings to the first extreme position, the blade side facing away from the first extreme position produces the greater lift and just after the blade swings to the second extreme position, the blade side facing away from the second extreme position produces the greater lift, said mechanism reversing said device to reverse the lift differential only at the extreme positions of the blade so that the blade oscillates between said extreme positions in the presence of the moving fluid stream;
   first and second fluid boundaries located adjacent to respective first and second extreme positions of the blade close to trailing edge of the blade when the blade is in said first and second extreme positions for simultaneously causing a substantial blocking of the flow of the moving fluid stream on the blade side facing each extreme position and a rapid increase in said flow on the opposite blade side when the blade reaches each extreme position to impel the blade toward the other extreme position, and
   a power takeoff device which reciprocates in response to the blade oscillation for driving an external machine.

31. The apparatus defined in claim 30 wherein the aerodynamic device is selected from the group consisting of a flap, a Magnus roller and positive or negative fluid pressure sources at opposite sides of the blade.

32. The apparatus defined in claim 30 and further including a second power generation apparatus similar to said first-mentioned apparatus, and
   a coupling device coupling together the two power takeoff devices of said first-mentioned and second power generation apparatus so that the two power takeoff devices reciprocate 180° out of phase.

33. The apparatus defined in claim 32 wherein the coupling device includes a crank or clutch having an output shaft which is rotated unidirectionally in response to the oscillations of the two blades.

34. The apparatus defined in claim 33 and further including an electric generator having an armature coupled to said output shaft.

* * * * *